United States Patent
Burt et al.

(10) Patent No.: US 9,235,023 B2
(45) Date of Patent: Jan. 12, 2016

(54) VARIABLE LENS SLEEVE SPACER

(71) Applicant: FLIR Systems, Inc., Wilsonville, OR (US)

(72) Inventors: Warn Burt, Solvang, CA (US); Theodore R. Hoelter, Goleta, CA (US); Kevin Birch, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 169 days.

(21) Appl. No.: 13/802,495

(22) Filed: Mar. 13, 2013

(65) Prior Publication Data

US 2013/0270441 A1 Oct. 17, 2013

Related U.S. Application Data

(63) Continuation-in-part of application No. PCT/US2012/041744, filed on Jun. 8, 2012, and a continuation-in-part of application No. PCT/US2012/041749, filed on Jun. 8, 2012, and a (Continued)

(51) Int. Cl.
*G02B 7/02* (2006.01)
*G01J 5/08* (2006.01)
(Continued)

(52) U.S. Cl.
CPC ............... *G02B 7/02* (2013.01); *G01J 5/0205* (2013.01); *G01J 5/04* (2013.01); *G01J 5/0803* (2013.01); *G01J 5/0806* (2013.01); *G02B 7/021* (2013.01); *H04N 5/144* (2013.01); *H04N 5/2257* (2013.01); *H04N 5/33* (2013.01); *H04N 5/3651* (2013.01); *H04N 5/3656* (2013.01); *G01J 2005/0077* (2013.01); *Y10T 29/49826* (2015.01)

(58) Field of Classification Search
CPC ....... G01J 5/0205; G01J 5/0806; G01J 5/084; G02B 7/04; G02B 7/02; G02B 7/10; H04N 5/33; H04N 5/144; H04N 5/3651; H04N 5/2257; H04N 5/3656
USPC ................................................ 250/338.1, 234
See application file for complete search history.

(56) References Cited

U.S. PATENT DOCUMENTS 2,764,055 A    9/1956   Clemens et al.
5,302,991 A *   4/1994   Nakayama ...................... 396/81
(Continued)

FOREIGN PATENT DOCUMENTS

CN          2874947       2/2007
CN          2899321       5/2007
(Continued)

*Primary Examiner* — David Porta
*Assistant Examiner* — Mindy Vu
(74) *Attorney, Agent, or Firm* — Haynes and Boone, LLP

(57) ABSTRACT

Various techniques are disclosed for providing systems and methods for orienting one or more lenses or other optical elements in a lens sleeve. For example, a system may include a lens sleeve defining an interior lens cavity. A plurality of lens positioning features extend from the lens sleeve adjacent the interior lens cavity. A first lens is secured in the lens cavity at a first position relative to the lens sleeve. A first set of the lens positioning features are located at a second position relative to the lens sleeve, and a second set of the lens positioning features are located at a third position relative to the lens sleeve. A second lens engages either the first set or the second set of the plurality of lens positioning features depending on a desired distance between the first lens and the second lens.

22 Claims, 20 Drawing Sheets

Related U.S. Application Data continuation-in-part of application No. PCT/US2012/041739, filed on Jun. 8, 2012.

(60) Provisional application No. 61/612,109, filed on Mar. 16, 2012, provisional application No. 61/656,889, filed on Jun. 7, 2012, provisional application No. 61/545,056, filed on Oct. 7, 2011, provisional application No. 61/495,873, filed on Jun. 10, 2011, provisional application No. 61/495,879, filed on Jun. 10, 2011, provisional application No. 61/495,888, filed on Jun. 10, 2011.

(51) Int. Cl.

| | |
|---|---|
| *G01J 5/02* | (2006.01) |
| *G01J 5/04* | (2006.01) |
| *H04N 5/33* | (2006.01) |
| *H04N 5/14* | (2006.01) |
| *H04N 5/365* | (2011.01) |
| *H04N 5/225* | (2006.01) |
| *G01J 5/00* | (2006.01) |

(56) References Cited

U.S. PATENT DOCUMENTS

| | | |
|---|---|---|
| 6,297,794 B1 | 10/2001 | Tsubouchi et al. |
| 6,330,371 B1 | 12/2001 | Chen et al. |
| 6,348,951 B1 | 2/2002 | Kim |
| 6,396,543 B1 | 5/2002 | Shin et al. |
| 6,424,843 B1 | 7/2002 | Reitmaa et al. |
| 6,501,909 B1 * | 12/2002 | Nishimura et al. .............. 396/74 |
| 6,633,231 B1 | 10/2003 | Okamoto et al. |
| 6,681,120 B1 | 1/2004 | Kim |
| 6,813,442 B2 * | 11/2004 | Matsuda ......................... 396/91 |
| 6,883,054 B2 | 4/2005 | Yamaguchi et al. |
| 7,050,107 B1 | 5/2006 | Frank et al. |
| D524,785 S | 7/2006 | Huang |
| 7,084,857 B2 | 8/2006 | Lieberman et al. |
| 7,208,733 B2 | 4/2007 | Mian et al. |
| 7,263,379 B1 | 8/2007 | Parkulo et al. |
| 7,284,921 B2 | 10/2007 | Lapstun et al. |
| 7,296,747 B2 | 11/2007 | Rohs |
| 7,305,368 B2 | 12/2007 | Lieberman et al. |
| 7,321,783 B2 | 1/2008 | Kim |
| 7,333,832 B2 | 2/2008 | Tsai et al. |
| 7,377,835 B2 | 5/2008 | Parkulo et al. |
| 7,453,064 B2 | 11/2008 | Lee |
| 7,477,309 B2 | 1/2009 | Cuccias |
| 7,567,818 B2 | 7/2009 | Pylkko |
| 7,572,077 B2 | 8/2009 | Lapstun et al. |
| 7,575,077 B2 | 8/2009 | Priepke et al. |
| 7,595,904 B2 | 9/2009 | Lapstun et al. |
| 7,616,877 B2 | 11/2009 | Zarnowski et al. |
| 7,627,364 B2 | 12/2009 | Sato |
| 7,697,962 B2 | 4/2010 | Cradick et al. |
| 7,723,686 B2 | 5/2010 | Hannebauer |
| 7,725,141 B2 | 5/2010 | Su |
| 7,728,281 B2 | 6/2010 | Chen |
| 7,735,974 B2 | 6/2010 | Silverbrook et al. |
| 7,746,585 B2 * | 6/2010 | Chang .......................... 359/891 |
| 7,747,454 B2 | 6/2010 | Bartfeld et al. |
| 7,760,919 B2 | 7/2010 | Namgoong |
| 7,761,114 B2 | 7/2010 | Silverbrook et al. |
| 7,773,870 B2 | 8/2010 | Naruse |
| 7,801,733 B2 | 9/2010 | Lee et al. |
| 7,810,733 B2 | 10/2010 | Silverbrook et al. |
| 7,900,842 B2 | 3/2011 | Silverbrook et al. |
| 7,903,152 B2 | 3/2011 | Kim |
| 7,947,222 B2 | 5/2011 | Bae et al. |
| 7,960,700 B2 | 6/2011 | Craig et al. |
| 8,275,413 B1 | 9/2012 | Fraden et al. |
| 8,305,577 B2 | 11/2012 | Kivioja et al. |
| 8,345,226 B2 | 1/2013 | Zhang |
| 8,537,343 B2 | 9/2013 | Zhang |
| 2002/0006337 A1 | 1/2002 | Kimura et al. |
| 2002/0058352 A1 | 5/2002 | Jacksen et al. |
| 2002/0122036 A1 | 9/2002 | Sasaki |
| 2002/0135571 A1 | 9/2002 | Klocek et al. |
| 2002/0149600 A1 | 10/2002 | Van Splunter et al. |
| 2003/0007193 A1 | 1/2003 | Sato et al. |
| 2003/0112871 A1 | 6/2003 | Demos |
| 2003/0122957 A1 | 7/2003 | Emme |
| 2003/0223623 A1 | 12/2003 | Gutta et al. |
| 2004/0047518 A1 | 3/2004 | Tiana |
| 2004/0101298 A1 | 5/2004 | Mandelbaum et al. |
| 2004/0127156 A1 | 7/2004 | Park |
| 2004/0128070 A1 | 7/2004 | Schmidt et al. |
| 2004/0157612 A1 | 8/2004 | Kim |
| 2004/0165788 A1 | 8/2004 | Perez et al. |
| 2004/0169860 A1 | 9/2004 | Jung et al. |
| 2004/0207036 A1 | 10/2004 | Ikeda |
| 2004/0256561 A1 | 12/2004 | Beuhler et al. |
| 2005/0024741 A1 * | 2/2005 | Onda ............................ 359/704 |
| 2005/0030314 A1 | 2/2005 | Dawson |
| 2005/0067852 A1 | 3/2005 | Jeong |
| 2005/0068333 A1 | 3/2005 | Nakahashi et al. |
| 2005/0089241 A1 | 4/2005 | Kawanishi et al. |
| 2005/0093890 A1 | 5/2005 | Baudisch |
| 2005/0110803 A1 | 5/2005 | Sugimura |
| 2005/0138569 A1 | 6/2005 | Baxter et al. |
| 2005/0169655 A1 | 8/2005 | Koyama et al. |
| 2005/0184993 A1 | 8/2005 | Ludwin et al. |
| 2005/0213813 A1 | 9/2005 | Lin et al. |
| 2005/0213853 A1 | 9/2005 | Maier et al. |
| 2005/0219249 A1 | 10/2005 | Xie et al. |
| 2005/0248912 A1 | 11/2005 | Kang et al. |
| 2005/0265688 A1 | 12/2005 | Kobayashi |
| 2005/0270784 A1 | 12/2005 | Hahn et al. |
| 2005/0277447 A1 | 12/2005 | Buil et al. |
| 2006/0039686 A1 | 2/2006 | Soh et al. |
| 2006/0060984 A1 | 3/2006 | Wakabayashi et al. |
| 2006/0077246 A1 | 4/2006 | Kawakami et al. |
| 2006/0097172 A1 | 5/2006 | Park |
| 2006/0120712 A1 | 6/2006 | Kim |
| 2006/0132642 A1 | 6/2006 | Hosaka et al. |
| 2006/0140501 A1 | 6/2006 | Tadas |
| 2006/0147191 A1 | 7/2006 | Kim |
| 2006/0154559 A1 | 7/2006 | Yoshida |
| 2006/0210249 A1 | 9/2006 | Seto |
| 2006/0234744 A1 | 10/2006 | Sung et al. |
| 2006/0240867 A1 | 10/2006 | Wang et al. |
| 2006/0279758 A1 | 12/2006 | Myoki |
| 2006/0285907 A1 | 12/2006 | Kang et al. |
| 2007/0019077 A1 | 1/2007 | Park |
| 2007/0019099 A1 | 1/2007 | Lieberman et al. |
| 2007/0019103 A1 | 1/2007 | Lieberman et al. |
| 2007/0033309 A1 | 2/2007 | Kuwabara et al. |
| 2007/0034800 A1 | 2/2007 | Huang |
| 2007/0052616 A1 | 3/2007 | Yoon |
| 2007/0057764 A1 | 3/2007 | Sato et al. |
| 2007/0103479 A1 | 5/2007 | Kim et al. |
| 2007/0120879 A1 | 5/2007 | Kanade et al. |
| 2007/0132858 A1 | 6/2007 | Chiba et al. |
| 2007/0139739 A1 | 6/2007 | Kim et al. |
| 2007/0159524 A1 | 7/2007 | Kim et al. |
| 2007/0189583 A1 | 8/2007 | Shimada et al. |
| 2007/0211164 A1 * | 9/2007 | Olsen et al. .................. 348/345 |
| 2007/0211965 A1 | 9/2007 | Helbing et al. |
| 2007/0222798 A1 | 9/2007 | Kuno |
| 2007/0248284 A1 | 10/2007 | Bernsen et al. |
| 2007/0274541 A1 | 11/2007 | Uetake et al. |
| 2007/0285439 A1 | 12/2007 | King et al. |
| 2007/0286517 A1 | 12/2007 | Paik et al. |
| 2007/0299226 A1 | 12/2007 | Park et al. |
| 2008/0038579 A1 | 2/2008 | Schuisky et al. |
| 2008/0056612 A1 | 3/2008 | Park et al. |
| 2008/0079834 A1 | 4/2008 | Chung et al. |
| 2008/0112012 A1 | 5/2008 | Yokoyama et al. |
| 2008/0151056 A1 | 6/2008 | Ahamefula |
| 2008/0165190 A1 | 7/2008 | Min et al. |
| 2008/0165342 A1 | 7/2008 | Yoshida et al. |
| 2008/0170082 A1 | 7/2008 | Kim |

(56) References Cited

U.S. PATENT DOCUMENTS

| | | |
|---|---|---|
| 2008/0218474 A1 | 9/2008 | Ahn et al. |
| 2008/0248833 A1 | 10/2008 | Silverbrook et al. |
| 2008/0259181 A1 | 10/2008 | Yamashita et al. |
| 2008/0266079 A1 | 10/2008 | Lontka |
| 2008/0278772 A1 | 11/2008 | Silverbrook et al. |
| 2008/0284880 A1 | 11/2008 | Numata |
| 2008/0292144 A1 | 11/2008 | Kim |
| 2008/0297614 A1 | 12/2008 | Lieberman et al. |
| 2009/0023421 A1 | 1/2009 | Parkulo et al. |
| 2009/0027525 A1 | 1/2009 | Lin et al. |
| 2009/0040042 A1 | 2/2009 | Lontka |
| 2009/0040195 A1 | 2/2009 | Njolstad et al. |
| 2009/0052883 A1 | 2/2009 | Lee et al. |
| 2009/0129700 A1 | 5/2009 | Rother et al. |
| 2009/0131104 A1 | 5/2009 | Yoon |
| 2009/0148019 A1 | 6/2009 | Hamada et al. |
| 2009/0213110 A1 | 8/2009 | Kato et al. |
| 2009/0215479 A1 | 8/2009 | Karmarkar |
| 2009/0227287 A1 | 9/2009 | Kotidis |
| 2009/0238238 A1 | 9/2009 | Hollander et al. |
| 2009/0278048 A1 | 11/2009 | Choe et al. |
| 2009/0297062 A1 | 12/2009 | Molne et al. |
| 2009/0303363 A1 | 12/2009 | Blessinger |
| 2010/0020229 A1 | 1/2010 | Hershey et al. |
| 2010/0066866 A1 | 3/2010 | Lim |
| 2010/0090983 A1 | 4/2010 | Challener et al. |
| 2010/0103141 A1 | 4/2010 | Challener et al. |
| 2010/0113068 A1 | 5/2010 | Rothschild |
| 2010/0131268 A1 | 5/2010 | Moeller |
| 2010/0144387 A1 | 6/2010 | Chou |
| 2010/0163730 A1 | 7/2010 | Schmidt et al. |
| 2010/0234067 A1 | 9/2010 | Silverbrook et al. |
| 2010/0245582 A1 | 9/2010 | Harel |
| 2010/0245585 A1 | 9/2010 | Fisher et al. |
| 2010/0245826 A1 | 9/2010 | Lee |
| 2010/0314543 A1 | 12/2010 | Lee et al. |
| 2011/0043486 A1 | 2/2011 | Hagiwara et al. |
| 2011/0063446 A1 | 3/2011 | McMordie et al. |
| 2011/0102599 A1 | 5/2011 | Kwon et al. |
| 2011/0117532 A1 | 5/2011 | Relyea et al. |
| 2011/0121978 A1 | 5/2011 | Schwörer et al. |
| 2011/0122075 A1 | 5/2011 | Seo et al. |
| 2011/0128384 A1 | 6/2011 | Tiscareno et al. |
| 2012/0007987 A1 | 1/2012 | Gaber |
| 2012/0083314 A1 | 4/2012 | Ng et al. |
| 2012/0184252 A1 | 7/2012 | Hirsch |
| 2012/0273688 A1 | 11/2012 | Tsai et al. |
| 2012/0274814 A1 | 11/2012 | Wajs |
| 2012/0276954 A1 | 11/2012 | Kowalsky |
| 2012/0292518 A1 | 11/2012 | Goldstein |
| 2013/0204570 A1 | 8/2013 | Mendelson et al. |

FOREIGN PATENT DOCUMENTS

| | | |
|---|---|---|
| CN | 201203922 | 3/2009 |
| CN | 101635754 | 1/2010 |
| CN | 201481406 | 5/2010 |
| CN | 201550169 | 8/2010 |
| CN | 101859209 | 10/2010 |
| CN | 201628839 | 11/2010 |
| CN | 101945154 | 1/2011 |
| CN | 102055836 | 5/2011 |
| CN | 201897853 | 7/2011 |
| CN | 102178510 | 9/2011 |
| CN | 102880289 | 1/2013 |
| CN | 202998279 | 6/2013 |
| EP | 1983485 | 10/2008 |
| EP | 2136554 | 12/2009 |
| EP | 2477391 | 7/2012 |
| JP | 1997275518 | 4/1999 |
| JP | 2004/004465 | 1/2004 |
| JP | 2004048571 | 2/2004 |
| JP | 2004/241491 | 8/2004 |
| JP | 2006098098 | 4/2006 |
| JP | 2006105655 | 4/2006 |
| JP | 2007006475 | 1/2007 |
| JP | 2007/267035 | 10/2007 |
| JP | 2007325842 | 12/2007 |
| JP | 2010181324 | 8/2010 |
| KR | 20000026757 | 5/2000 |
| KR | 100227582 | 11/2000 |
| KR | 100272582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |
| KR | 20010014992 | 2/2001 |
| KR | 20010044756 | 6/2001 |
| KR | 20010050263 | 6/2001 |
| KR | 20010060752 | 7/2001 |
| KR | 20010068202 | 7/2001 |
| KR | 20010070355 | 7/2001 |
| KR | 20010074565 | 8/2001 |
| KR | 20020006967 | 1/2002 |
| KR | 20020044339 | 6/2002 |
| KR | 20020049605 | 6/2002 |
| KR | 20060071220 | 6/2002 |
| KR | 20020061406 | 7/2002 |
| KR | 20020061920 | 7/2002 |
| KR | 20020069690 | 9/2002 |
| KR | 20020078469 | 10/2002 |
| KR | 20020083368 | 11/2002 |
| KR | 20020083961 | 11/2002 |
| KR | 20020085124 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030037101 | 5/2003 |
| KR | 20030051140 | 6/2003 |
| KR | 20030055693 | 7/2003 |
| KR | 20030056667 | 7/2003 |
| KR | 20030067116 | 8/2003 |
| KR | 20030085742 | 11/2003 |
| KR | 20030088968 | 11/2003 |
| KR | 20040001684 | 1/2004 |
| KR | 20040001686 | 1/2004 |
| KR | 20040023826 | 3/2004 |
| KR | 20040027692 | 4/2004 |
| KR | 20040033223 | 4/2004 |
| KR | 20040033532 | 4/2004 |
| KR | 20040033986 | 4/2004 |
| KR | 20040033993 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 100437890 | 6/2004 |
| KR | 20040054416 | 6/2004 |
| KR | 20040058969 | 7/2004 |
| KR | 20040062802 | 7/2004 |
| KR | 20040064855 | 7/2004 |
| KR | 20040066724 | 7/2004 |
| KR | 20040068864 | 8/2004 |
| KR | 20040070840 | 8/2004 |
| KR | 20040076308 | 9/2004 |
| KR | 20040086994 | 10/2004 |
| KR | 20040102386 | 12/2004 |
| KR | 20050008245 | 1/2005 |
| KR | 20050011313 | 1/2005 |
| KR | 20050012505 | 2/2005 |
| KR | 20050014448 | 2/2005 |
| KR | 20050015293 | 2/2005 |
| KR | 20050015526 | 2/2005 |
| KR | 20050015745 | 2/2005 |
| KR | 20050018370 | 2/2005 |
| KR | 20050023950 | 3/2005 |
| KR | 20050028537 | 3/2005 |
| KR | 20050033308 | 4/2005 |

(56) References Cited

FOREIGN PATENT DOCUMENTS

| | | |
|---|---|---|
| KR | 101006660 | 9/2005 |
| KR | 1020050095463 | 9/2005 |
| KR | 100547739 | 1/2006 |
| KR | 20060023957 | 3/2006 |
| KR | 1020060019715 | 3/2006 |
| KR | 100645746 | 5/2006 |
| KR | 20060054877 | 5/2006 |
| KR | 100612890 | 8/2006 |
| KR | 100633792 | 10/2006 |
| KR | 100646966 | 11/2006 |
| KR | 20060119077 | 11/2006 |
| KR | 20060119236 | 11/2006 |
| KR | 20060120318 | 11/2006 |
| KR | 20060121595 | 11/2006 |
| KR | 100660125 | 12/2006 |
| KR | 100663528 | 1/2007 |
| KR | 100672377 | 1/2007 |
| KR | 20070002590 | 1/2007 |
| KR | 20070005263 | 1/2007 |
| KR | 20070005553 | 1/2007 |
| KR | 20070009380 | 1/2007 |
| KR | 100677913 | 2/2007 |
| KR | 20070028201 | 3/2007 |
| KR | 100729813 | 6/2007 |
| KR | 20070067650 | 6/2007 |
| KR | 100743171 | 7/2007 |
| KR | 100743254 | 7/2007 |
| KR | 20070068501 | 7/2007 |
| KR | 20070078477 | 8/2007 |
| KR | 20070082960 | 8/2007 |
| KR | 20070087513 | 8/2007 |
| KR | 20070091486 | 9/2007 |
| KR | 100766953 | 10/2007 |
| KR | 100771364 | 10/2007 |
| KR | 20070104957 | 10/2007 |
| KR | 100777428 | 11/2007 |
| KR | 20070115754 | 12/2007 |
| KR | 20070122344 | 12/2007 |
| KR | 20070122345 | 12/2007 |
| KR | 100802525 | 2/2008 |
| KR | 20080013314 | 2/2008 |
| KR | 20080015099 | 2/2008 |
| KR | 20080015100 | 2/2008 |
| KR | 20080015973 | 2/2008 |
| KR | 20080018407 | 2/2008 |
| KR | 100822053 | 4/2008 |
| KR | 20080045551 | 5/2008 |
| KR | 100841243 | 6/2008 |
| KR | 20080053057 | 6/2008 |
| KR | 20080054596 | 6/2008 |
| KR | 100846192 | 7/2008 |
| KR | 20080059882 | 7/2008 |
| KR | 20080069007 | 7/2008 |
| KR | 100854932 | 8/2008 |
| KR | 20080071070 | 8/2008 |
| KR | 20080078315 | 8/2008 |
| KR | 100866177 | 10/2008 |
| KR | 100866475 | 11/2008 |
| KR | 100866476 | 11/2008 |
| KR | 100866573 | 11/2008 |
| KR | 100870724 | 11/2008 |
| KR | 20080096918 | 11/2008 |
| KR | 20080098409 | 11/2008 |
| KR | 100871916 | 12/2008 |
| KR | 20080112331 | 12/2008 |
| KR | 20090003899 | 1/2009 |
| KR | 20090018486 | 2/2009 |
| KR | 20090020864 | 2/2009 |
| KR | 100888554 | 3/2009 |
| KR | 20090036734 | 4/2009 |
| KR | 100897170 | 5/2009 |
| KR | 20090052526 | 5/2009 |
| KR | 100901784 | 6/2009 |
| KR | 100903348 | 6/2009 |
| KR | 20090089931 | 8/2009 |
| KR | 100922497 | 10/2009 |
| KR | 20090105424 | 10/2009 |
| KR | 100932752 | 12/2009 |
| KR | 100935495 | 1/2010 |
| KR | 20100006652 | 1/2010 |
| KR | 2010022327 | 3/2010 |
| KR | 20100039170 | 4/2010 |
| KR | 100958030 | 5/2010 |
| KR | 20100059681 | 6/2010 |
| KR | 20100070116 | 6/2010 |
| KR | 20100070119 | 6/2010 |
| KR | 20100072994 | 7/2010 |
| KR | 100977516 | 8/2010 |
| KR | 2010091758 | 8/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 100990904 | 11/2010 |
| KR | 20100123021 | 11/2010 |
| KR | 1006660 | 1/2011 |
| KR | 20110006437 | 1/2011 |
| KR | 20110011264 | 2/2011 |
| KR | 2011019994 | 3/2011 |
| KR | 2011024290 | 3/2011 |
| KR | 1111167 | 2/2012 |
| WO | WO 0023814 | 4/2000 |
| WO | WO 03/093963 | 11/2003 |
| WO | WO 2005/002228 | 1/2005 |
| WO | WO 2005/088846 | 9/2005 |
| WO | WO 2006/112866 | 10/2006 |
| WO | WO 2007/006242 | 1/2007 |
| WO | WO 2009/122114 | 10/2009 |
| WO | WO 2010/005152 | 1/2010 |
| WO | WO 2010/033142 | 3/2010 |

\* cited by examiner

VARIABLE LENS SLEEVE SPACER

CROSS-REFERENCE TO RELATED APPLICATIONS

This patent application claims priority to and the benefit of U.S. Provisional Patent Application No. 61/612,109 filed Mar. 16, 2012, which is incorporated herein by reference in its entirety.

This application is a continuation-in-part of International Patent Application No. PCT/US2012/041744 filed Jun. 8, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/656,889 filed Jun. 7, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041744 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041744 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041744 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

This application is a continuation-in-part of International Patent Application No. PCT/US2012/041749 filed Jun. 8, 2012 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041749 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041749 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

This application is a continuation-in-part of International Patent Application No. PCT/US2012/041739 filed Jun. 8, 2012 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041739 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

TECHNICAL FIELD

One or more embodiments of the present disclosure relate generally to thermal imaging devices and more particularly to a lens sleeve for an imaging device.

BACKGROUND

Some imaging devices utilize one or more lenses and/or other optical elements that must be precisely positioned relative to each other and/or relative to an imager array (e.g., an infrared imaging array) to allow for high resolution imaging. However, manufacturing variability of the lenses, lens mounting features, and other components in the imaging device can present problems with this precise positioning. For example, as is known in the art, variation across wafers (e.g., from lot to lot) that are used to provide components of the imaging device may vary the optimal distance between lenses used in the imaging device. Conventionally, a different lens sleeve has been provided for each spacing distance needed between the lenses, and the appropriate lens sleeve is then selected in order to position the lenses relative to each other at a distance that compensates for any of the manufacturing variability discussed above. Such conventional solutions have increased the costs associated with the manufacture of imaging devices.

SUMMARY

Various techniques are disclosed for providing systems and methods for properly spacing one or more lenses and/or other optical elements in a lens sleeve relative to each other and/or to an imager array (e.g., an infrared imaging array).

In one embodiment, a lens spacing system includes a lens sleeve defining a lens cavity; a first lens seat that is located on the lens sleeve and adjacent the lens cavity and that is operable to engage a first lens when the first lens is positioned in the lens cavity; and a plurality of lens positioning features located on the lens sleeve and adjacent the lens cavity; wherein a first set of the plurality of lens positioning features are operable to engage a second lens to orient the second lens a first distance from the first lens, and wherein a second set of the plurality of lens positioning features are operable to engage the second lens to orient the second lens a second distance from the first lens that is different than the first distance.

In another embodiment, a thermal imaging device includes a housing; at least one infrared sensor located in the housing; a lens sleeve coupled to the housing and defining an interior lens cavity; a first lens secured in the lens cavity and spaced apart from the at least one infrared sensor at a first position relative to the lens sleeve; a plurality of lens positioning features extending from the lens sleeve, located adjacent the lens cavity, and including a first set that provide a first lens support surface located at a second position relative to the lens sleeve that is different from the first position, and a second set that provide a second lens support surface located at a third position relative to the lens sleeve that is different from the first position and the second position; and a second lens engaging either the first set or the second set of the plurality of lens positioning features.

In another embodiment, a method for spacing lenses includes providing a lens sleeve defining a lens cavity and including a plurality of lens positioning features that extend from the lens sleeve and include a first set and a second set; positioning a first lens in the lens cavity; and positioning a second lens in the lens cavity by engaging the second lens with either the first set or the second set of the plurality of lens positioning features; wherein the engagement of the second lens with the first set of the plurality of lens positioning features positions the second lens a first distance from the first lens; and wherein the engagement of the second lens with the second set of the plurality of lens positioning features position the second lens a second distance from the first lens that is different from the first distance.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
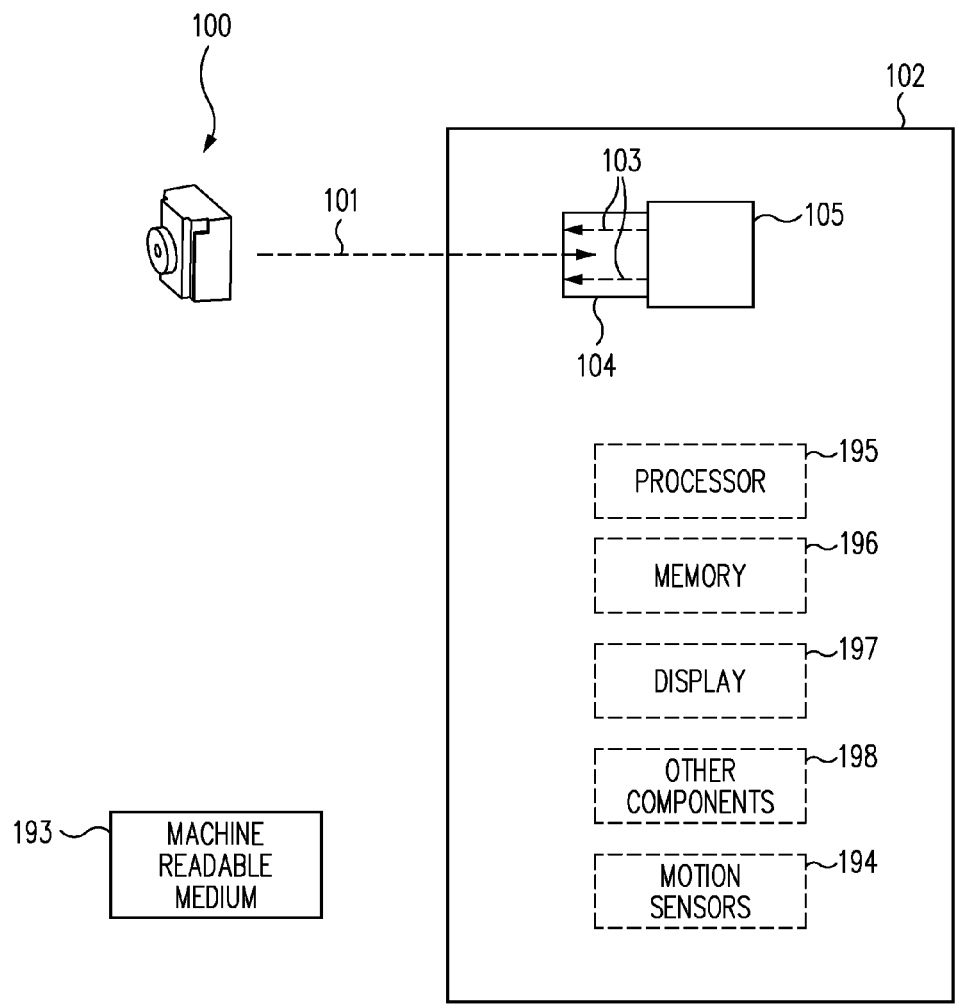
FIG. 1 illustrates an infrared imaging module configured to be implemented in a host device in accordance with an embodiment of the disclosure.

FIG. 1 illustrates an infrared imaging module 100 (e.g., an infrared camera or an infrared imaging device) configured to be implemented in a host device 102 in accordance with an embodiment of the disclosure. Infrared imaging module 100 may be implemented, for one or more embodiments, with a small form factor and in accordance with wafer level packaging techniques or other packaging techniques.

In one embodiment, infrared imaging module 100 may be configured to be implemented in a small portable host device 102, such as a mobile telephone, a tablet computing device, a laptop computing device, a personal digital assistant, a visible light camera, a music player, or any other appropriate mobile device. In this regard, infrared imaging module 100 may be used to provide infrared imaging features to host device 102. For example, infrared imaging module 100 may be configured to capture, process, and/or otherwise manage infrared images and provide such infrared images to host device 102 for use in any desired fashion (e.g., for further processing, to store in memory, to display, to use by various applications running on host device 102, to export to other devices, or other uses).

In various embodiments, infrared imaging module 100 may be configured to operate at low voltage levels and over a wide temperature range. For example, in one embodiment, infrared imaging module 100 may operate using a power supply of approximately 2.4 volts, 2.5 volts, 2.8 volts, or lower voltages, and operate over a temperature range of approximately −20 degrees C. to approximately +60 degrees C. (e.g., providing a suitable dynamic range and performance over an environmental temperature range of approximately 80 degrees C.). In one embodiment, by operating infrared imaging module 100 at low voltage levels, infrared imaging module 100 may experience reduced amounts of self heating in comparison with other types of infrared imaging devices. As a result, infrared imaging module 100 may be operated with reduced measures to compensate for such self heating.

Figure 2:
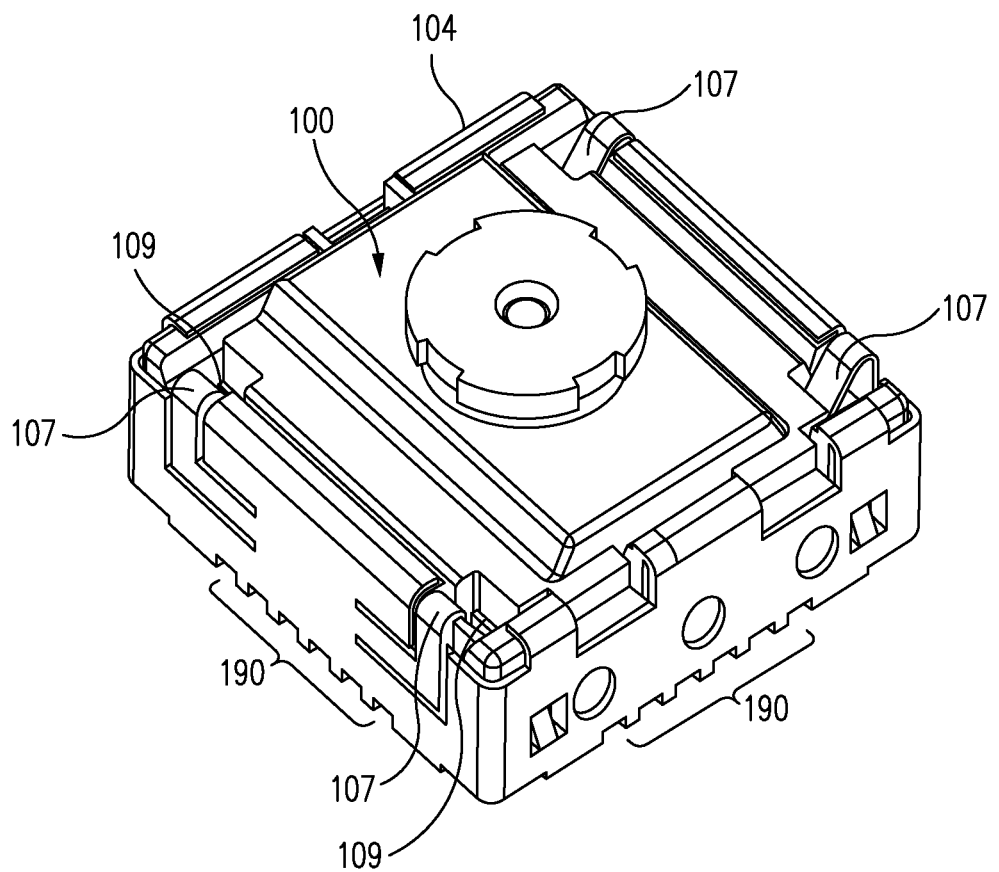
FIG. 2 illustrates an assembled infrared imaging module in accordance with an embodiment of the disclosure.

As shown in FIG. 1, host device 102 may include a socket 104, a shutter 105, motion sensors 194, a processor 195, a memory 196, a display 197, and/or other components 198. Socket 104 may be configured to receive infrared imaging module 100 as identified by arrow 101. In this regard, FIG. 2 illustrates infrared imaging module 100 assembled in socket 104 in accordance with an embodiment of the disclosure.

Motion sensors 194 may be implemented by one or more accelerometers, gyroscopes, or other appropriate devices that may be used to detect movement of host device 102. Motion sensors 194 may be monitored by and provide information to processing module 160 or processor 195 to detect motion. In various embodiments, motion sensors 194 may be implemented as part of host device 102 (as shown in FIG. 1), infrared imaging module 100, or other devices attached to or otherwise interfaced with host device 102.

Processor 195 may be implemented as any appropriate processing device (e.g., logic device, microcontroller, processor, application specific integrated circuit (ASIC), or other device) that may be used by host device 102 to execute appropriate instructions, such as software instructions provided in memory 196. Display 197 may be used to display captured and/or processed infrared images and/or other images, data, and information. Other components 198 may be used to implement any features of host device 102 as may be desired for various applications (e.g., clocks, temperature sensors, a visible light camera, or other components). In addition, a machine readable medium 193 may be provided for storing non-transitory instructions for loading into memory 196 and execution by processor 195.

In various embodiments, infrared imaging module 100 and socket 104 may be implemented for mass production to facilitate high volume applications, such as for implementation in mobile telephones or other devices (e.g., requiring small form factors). In one embodiment, the combination of infrared imaging module 100 and socket 104 may exhibit overall dimensions of approximately 8.5 mm by 8.5 mm by 5.9 mm while infrared imaging module 100 is installed in socket 104.

Figure 3:
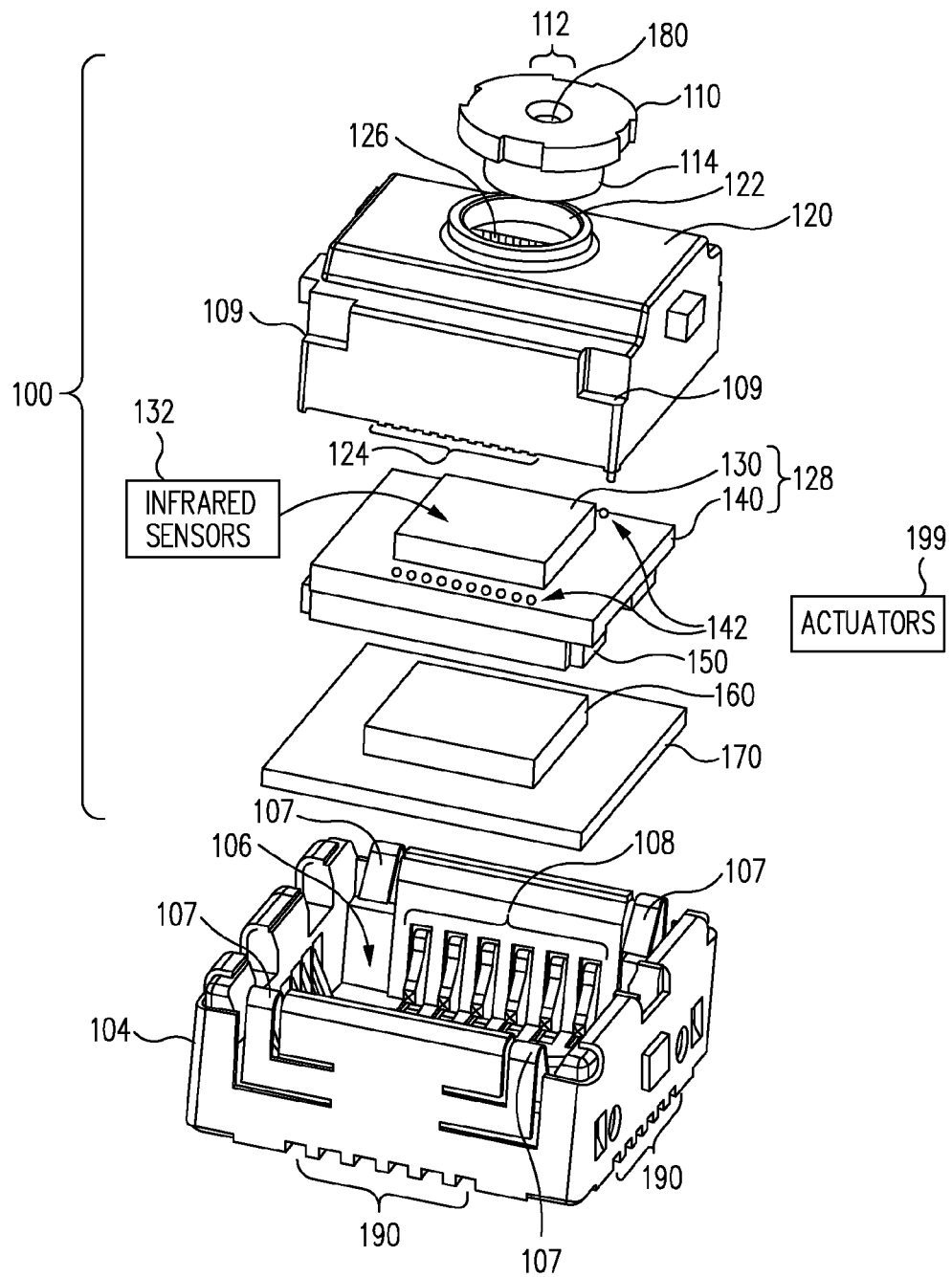
FIG. 3 illustrates an exploded view of an infrared imaging module juxtaposed over a socket in accordance with an embodiment of the disclosure.

FIG. 3 illustrates an exploded view of infrared imaging module 100 juxtaposed over socket 104 in accordance with an embodiment of the disclosure. Infrared imaging module 100 may include a lens barrel 110, a housing 120, an infrared sensor assembly 128, a circuit board 170, a base 150, and a processing module 160.

Lens barrel 110 may at least partially enclose an optical element 180 (e.g., a lens, a filter, and/or a variety of other optical elements known in the art) which is partially visible in FIG. 3 through an aperture 112 in lens barrel 110. Lens barrel 110 may include a substantially cylindrical extension 114 which may be used to interface lens barrel 110 with an aperture 122 in housing 120.

Infrared sensor assembly 128 may be implemented, for example, with a cap 130 (e.g., a lid) mounted on a substrate 140. Infrared sensor assembly 128 may include a plurality of infrared sensors 132 (e.g., infrared detectors) implemented in an array or other fashion on substrate 140 and covered by cap 130. For example, in one embodiment, infrared sensor assembly 128 may be implemented as a focal plane array (FPA). Such a focal plane array may be implemented, for example, as a vacuum package assembly (e.g., sealed by cap 130 and substrate 140). In one embodiment, infrared sensor assembly 128 may be implemented as a wafer level package (e.g., infrared sensor assembly 128 may be singulated from a set of vacuum package assemblies provided on a wafer). In one embodiment, infrared sensor assembly 128 may be implemented to operate using a power supply of approximately 2.4 volts, 2.5 volts, 2.8 volts, or similar voltages.

Infrared sensors 132 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. In one embodiment, infrared sensor assembly 128 may be provided in accordance with wafer level packaging techniques.

Infrared sensors 132 may be implemented, for example, as microbolometers or other types of thermal imaging infrared sensors arranged in any desired array pattern to provide a plurality of pixels. In one embodiment, infrared sensors 132 may be implemented as vanadium oxide (VOx) detectors with a 17 μm pixel pitch. In various embodiments, arrays of approximately 32 by 32 infrared sensors 132, approximately 64 by 64 infrared sensors 132, approximately 80 by 64 infrared sensors 132, or other array sizes may be used.

Substrate 140 may include various circuitry including, for example, a read out integrated circuit (ROIC) with dimensions less than approximately 5.5 mm by 5.5 mm in one embodiment. Substrate 140 may also include bond pads 142 that may be used to contact complementary connections positioned on inside surfaces of housing 120 when infrared imaging module 100 is assembled as shown in FIG. 3. In one embodiment, the ROIC may be implemented with low-dropout regulators (LDO) to perform voltage regulation to reduce power supply noise introduced to infrared sensor assembly 128 and thus provide an improved power supply rejection ratio (PSBR). Moreover, by implementing the LDO with the ROIC (e.g., within a wafer level package), less die area may be consumed and fewer discrete die (or chips) are needed.

Figure 4:
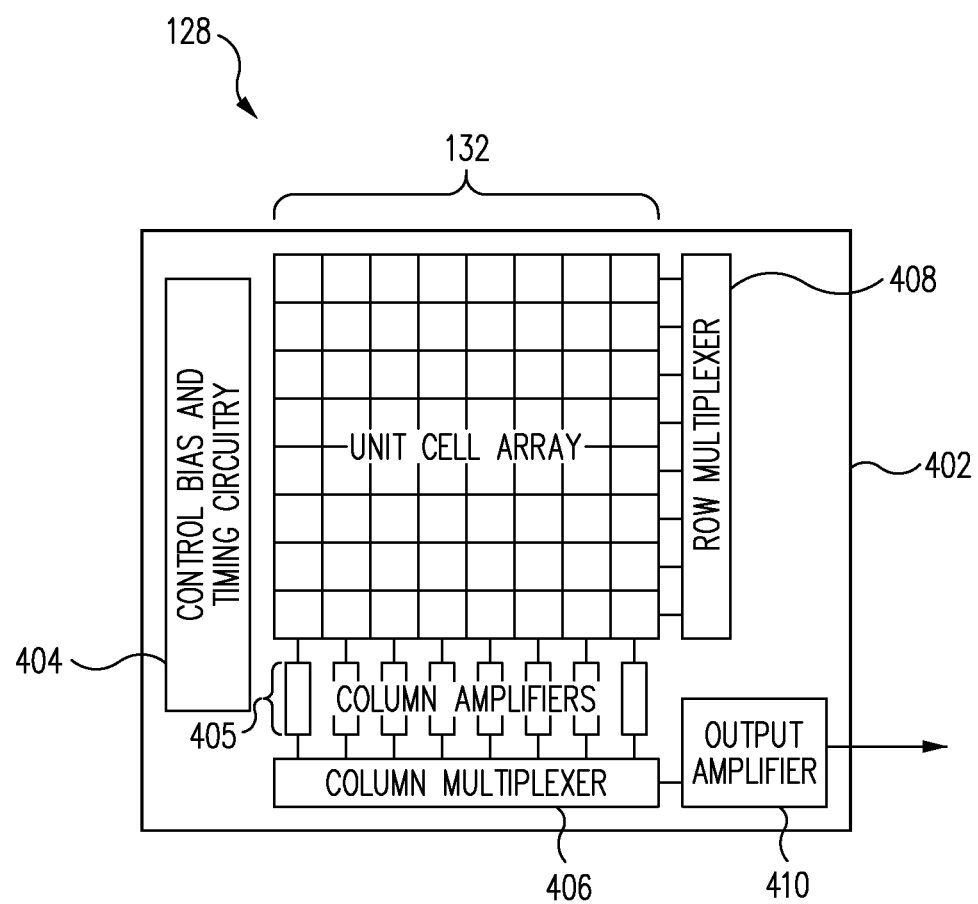
FIG. 4 illustrates a block diagram of an infrared sensor assembly including an array of infrared sensors in accordance with an embodiment of the disclosure.

FIG. 4 illustrates a block diagram of infrared sensor assembly 128 including an array of infrared sensors 132 in accordance with an embodiment of the disclosure. In the illustrated embodiment, infrared sensors 132 are provided as part of a unit cell array of a ROIC 402. ROIC 402 includes bias generation and timing control circuitry 404, column amplifiers 405, a column multiplexer 406, a row multiplexer 408, and an output amplifier 410. Image frames (e.g., thermal images) captured by infrared sensors 132 may be provided by output amplifier 410 to processing module 160, processor 195, and/or any other appropriate components to perform various processing techniques described herein. Although an 8 by 8 array is shown in FIG. 4, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Infrared sensor assembly 128 may capture images (e.g., image frames) and provide such images from its ROIC at various rates. Processing module 160 may be used to perform appropriate processing of captured infrared images and may be implemented in accordance with any appropriate architecture. In one embodiment, processing module 160 may be implemented as an ASIC. In this regard, such an ASIC may be configured to perform image processing with high performance and/or high efficiency. In another embodiment, processing module 160 may be implemented with a general purpose central processing unit (CPU) which may be configured to execute appropriate software instructions to perform image processing, coordinate and perform image processing with various image processing blocks, coordinate interfacing between processing module 160 and host device 102, and/or other operations. In yet another embodiment, processing module 160 may be implemented with a field programmable gate array (FPGA). Processing module 160 may be implemented with other types of processing and/or logic circuits in other embodiments as would be understood by one skilled in the art.

In these and other embodiments, processing module 160 may also be implemented with other components where appropriate, such as, volatile memory, non-volatile memory, and/or one or more interfaces (e.g., infrared detector interfaces, inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces).

In some embodiments, infrared imaging module 100 may further include one or more actuators 199 which may be used to adjust the focus of infrared image frames captured by infrared sensor assembly 128. For example, actuators 199 may be used to move optical element 180, and/or infrared sensors 132, and/or other components relative to each other to selectively focus and defocus infrared image frames in accordance with techniques described herein. Actuators 199 may be implemented in accordance with any type of motion-inducing apparatus or mechanism, and may positioned at any location within or external to infrared imaging module 100 as appropriate for different applications.

When infrared imaging module 100 is assembled, housing 120 may substantially enclose infrared sensor assembly 128, base 150, and processing module 160. Housing 120 may facilitate connection of various components of infrared imaging module 100. For example, in one embodiment, housing 120 may provide electrical connections 126 to connect various components as further described.

Electrical connections 126 (e.g., conductive electrical paths, traces, or other types of connections) may be electrically connected with bond pads 142 when infrared imaging module 100 is assembled. In various embodiments, electrical connections 126 may be embedded in housing 120, provided on inside surfaces of housing 120, and/or otherwise provided by housing 120. Electrical connections 126 may terminate in connections 124 protruding from the bottom surface of housing 120 as shown in FIG. 3. Connections 124 may connect with circuit board 170 when infrared imaging module 100 is assembled (e.g., housing 120 may rest atop circuit board 170 in various embodiments). Processing module 160 may be electrically connected with circuit board 170 through appropriate electrical connections. As a result, infrared sensor assembly 128 may be electrically connected with processing module 160 through, for example, conductive electrical paths provided by: bond pads 142, complementary connections on inside surfaces of housing 120, electrical connections 126 of housing 120, connections 124, and circuit board 170. Advantageously, such an arrangement may be implemented without requiring wire bonds to be provided between infrared sensor assembly 128 and processing module 160.

In various embodiments, electrical connections 126 in housing 120 may be made from any desired material (e.g., copper or any other appropriate conductive material). In one embodiment, electrical connections 126 may aid in dissipating heat from infrared imaging module 100.

Other connections may be used in other embodiments. For example, in one embodiment, sensor assembly 128 may be attached to processing module 160 through a ceramic board that connects to sensor assembly 128 by wire bonds and to processing module 160 by a ball grid array (BGA). In another embodiment, sensor assembly 128 may be mounted directly on a rigid flexible board and electrically connected with wire bonds, and processing module 160 may be mounted and connected to the rigid flexible board with wire bonds or a BGA.

The various implementations of infrared imaging module 100 and host device 102 set forth herein are provided for purposes of example, rather than limitation. In this regard, any of the various techniques described herein may be applied to any infrared camera system, infrared imager, or other device for performing infrared/thermal imaging.

Substrate 140 of infrared sensor assembly 128 may be mounted on base 150. In various embodiments, base 150 (e.g., a pedestal) may be made, for example, of copper formed by metal injection molding (MIM) and provided with a black oxide or nickel-coated finish. In various embodiments, base 150 may be made of any desired material, such as for example zinc, aluminum, or magnesium, as desired for a given application and may be formed by any desired applicable process, such as for example aluminum casting, MIM, or zinc rapid casting, as may be desired for particular applications. In various embodiments, base 150 may be implemented to provide structural support, various circuit paths, thermal heat sink properties, and other features where appropriate. In one embodiment, base 150 may be a multi-layer structure implemented at least in part using ceramic material.

In various embodiments, circuit board 170 may receive housing 120 and thus may physically support the various components of infrared imaging module 100. In various embodiments, circuit board 170 may be implemented as a printed circuit board (e.g., an FR4 circuit board or other types of circuit boards), a rigid or flexible interconnect (e.g., tape or other type of interconnects), a flexible circuit substrate, a flexible plastic substrate, or other appropriate structures. In various embodiments, base 150 may be implemented with the various features and attributes described for circuit board 170, and vice versa.

Socket 104 may include a cavity 106 configured to receive infrared imaging module 100 (e.g., as shown in the assembled view of FIG. 2). Infrared imaging module 100 and/or socket 104 may include appropriate tabs, arms, pins, fasteners, or any other appropriate engagement members which may be used to secure infrared imaging module 100 to or within socket 104 using friction, tension, adhesion, and/or any other appropriate manner. Socket 104 may include engagement members 107 that may engage surfaces 109 of housing 120 when infrared imaging module 100 is inserted into a cavity 106 of socket 104. Other types of engagement members may be used in other embodiments.

Infrared imaging module 100 may be electrically connected with socket 104 through appropriate electrical connections (e.g., contacts, pins, wires, or any other appropriate connections). For example, socket 104 may include electrical connections 108 which may contact corresponding electrical connections of infrared imaging module 100 (e.g., interconnect pads, contacts, or other electrical connections on side or bottom surfaces of circuit board 170, bond pads 142 or other electrical connections on base 150, or other connections). Electrical connections 108 may be made from any desired material (e.g., copper or any other appropriate conductive material). In one embodiment, electrical connections 108 may be mechanically biased to press against electrical connections of infrared imaging module 100 when infrared imaging module 100 is inserted into cavity 106 of socket 104. In one embodiment, electrical connections 108 may at least partially secure infrared imaging module 100 in socket 104. Other types of electrical connections may be used in other embodiments.

Socket 104 may be electrically connected with host device 102 through similar types of electrical connections. For example, in one embodiment, host device 102 may include electrical connections (e.g., soldered connections, snap-in connections, or other connections) that connect with electrical connections 108 passing through apertures 190. In various embodiments, such electrical connections may be made to the sides and/or bottom of socket 104.

Various components of infrared imaging module 100 may be implemented with flip chip technology which may be used to mount components directly to circuit boards without the additional clearances typically needed for wire bond connections. Flip chip connections may be used, as an example, to reduce the overall size of infrared imaging module 100 for use in compact small form factor applications. For example, in one embodiment, processing module 160 may be mounted to circuit board 170 using flip chip connections. For example, infrared imaging module 100 may be implemented with such flip chip configurations.

In various embodiments, infrared imaging module 100 and/or associated components may be implemented in accordance with various techniques (e.g., wafer level packaging techniques) as set forth in U.S. patent application Ser. No. 12/844,124 filed Jul. 27, 2010, and U.S. Provisional Patent Application No. 61/469,651 filed Mar. 30, 2011, which are incorporated herein by reference in their entirety. Furthermore, in accordance with one or more embodiments, infrared imaging module 100 and/or associated components may be implemented, calibrated, tested, and/or used in accordance with various techniques, such as for example as set forth in U.S. Pat. No. 7,470,902 issued Dec. 30, 2008, U.S. Pat. No. 6,028,309 issued Feb. 22, 2000, U.S. Pat. No. 6,812,465 issued Nov. 2, 2004, U.S. Pat. No. 7,034,301 issued Apr. 25, 2006, U.S. Pat. No. 7,679,048 issued Mar. 16, 2010, U.S. Pat. No. 7,470,904 issued Dec. 30, 2008, U.S. patent application Ser. No. 12/202,880 filed Sep. 2, 2008, and U.S. patent application Ser. No. 12/202,896 filed Sep. 2, 2008, which are incorporated herein by reference in their entirety.

Referring again to FIG. 1, in various embodiments, host device 102 may include shutter 105. In this regard, shutter 105 may be selectively positioned over socket 104 (e.g., as identified by arrows 103) while infrared imaging module 100 is installed therein. In this regard, shutter 105 may be used, for example, to protect infrared imaging module 100 when not in use. Shutter 105 may also be used as a temperature reference as part of a calibration process (e.g., a NUC process or other calibration processes) for infrared imaging module 100 as would be understood by one skilled in the art.

In various embodiments, shutter 105 may be made from various materials such as, for example, polymers, glass, aluminum (e.g., painted or anodized) or other materials. In various embodiments, shutter 105 may include one or more coatings to selectively filter electromagnetic radiation and/or adjust various optical properties of shutter 105 (e.g., a uniform blackbody coating or a reflective gold coating).

In another embodiment, shutter 105 may be fixed in place to protect infrared imaging module 100 at all times. In this case, shutter 105 or a portion of shutter 105 may be made from appropriate materials (e.g., polymers or infrared transmitting materials such as silicon, germanium, zinc selenide, or chalcogenide glasses) that do not substantially filter desired infrared wavelengths. In another embodiment, a shutter may be implemented as part of infrared imaging module 100 (e.g., within or as part of a lens barrel or other components of infrared imaging module 100), as would be understood by one skilled in the art.

Alternatively, in another embodiment, a shutter (e.g., shutter 105 or other type of external or internal shutter) need not be provided, but rather a NUC process or other type of calibration may be performed using shutterless techniques. In another embodiment, a NUC process or other type of calibration using shutterless techniques may be performed in combination with shutter-based techniques.

Infrared imaging module 100 and host device 102 may be implemented in accordance with any of the various techniques set forth in U.S. Provisional Patent Application No. 61/495,873 filed Jun. 10, 2011, U.S. Provisional Patent Application No. 61/495,879 filed Jun. 10, 2011, and U.S. Provisional Patent Application No. 61/495,888 filed Jun. 10, 2011, which are incorporated herein by reference in their entirety.

In various embodiments, the components of host device 102 and/or infrared imaging module 100 may be implemented as a local or distributed system with components in communication with each other over wired and/or wireless networks. Accordingly, the various operations identified in this disclosure may be performed by local and/or remote components as may be desired in particular implementations.

Figure 5:
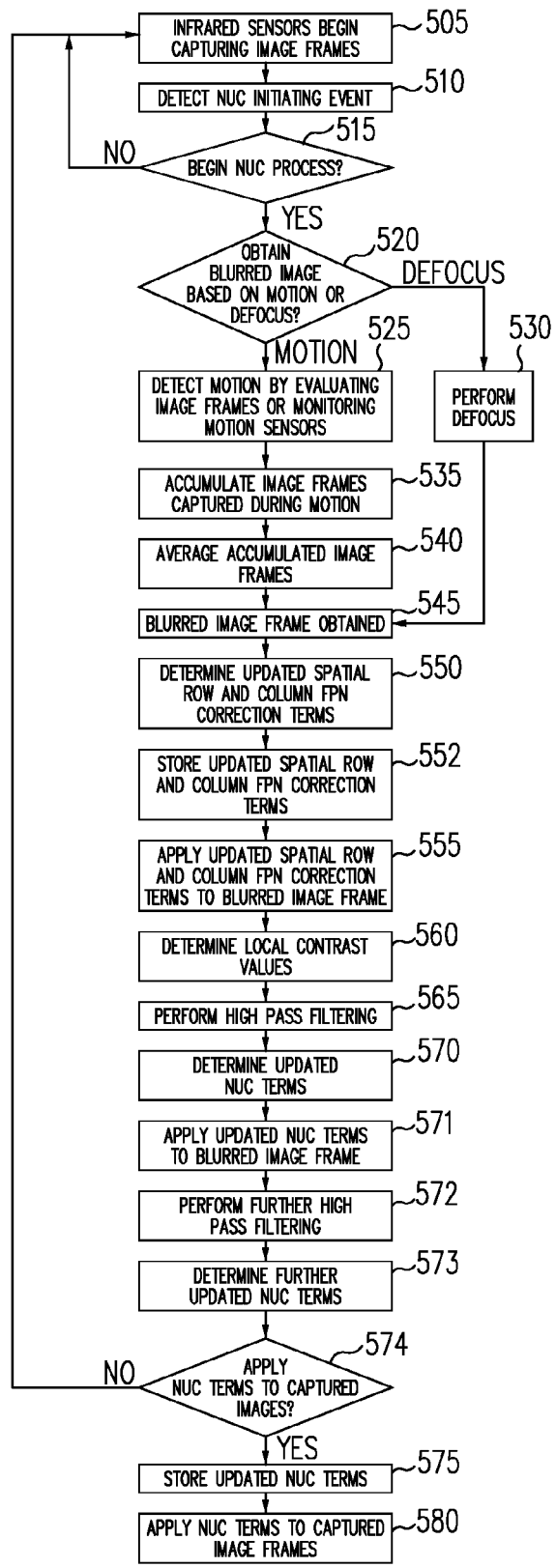
FIG. 5 illustrates a flow diagram of various operations to determine non-uniformity correction (NUC) terms in accordance with an embodiment of the disclosure.

FIG. 5 illustrates a flow diagram of various operations to determine NUC terms in accordance with an embodiment of the disclosure. In some embodiments, the operations of FIG. 5 may be performed by processing module 160 or processor 195 (both also generally referred to as a processor) operating on image frames captured by infrared sensors 132.

In block 505, infrared sensors 132 begin capturing image frames of a scene. Typically, the scene will be the real world environment in which host device 102 is currently located. In this regard, shutter 105 (if optionally provided) may be opened to permit infrared imaging module to receive infrared radiation from the scene. Infrared sensors 132 may continue capturing image frames during all operations shown in FIG. 5. In this regard, the continuously captured image frames may be used for various operations as further discussed. In one embodiment, the captured image frames may be temporally filtered (e.g., in accordance with the process of block 826 further described herein with regard to FIG. 8) and be processed by other terms (e.g., factory gain terms 812, factory offset terms 816, previously determined NUC terms 817, column FPN terms 820, and row FPN terms 824 as further described herein with regard to FIG. 8) before they are used in the operations shown in FIG. 5.

In block 510, a NUC process initiating event is detected. In one embodiment, the NUC process may be initiated in response to physical movement of host device 102. Such movement may be detected, for example, by motion sensors 194 which may be polled by a processor. In one example, a user may move host device 102 in a particular manner, such as by intentionally waving host device 102 back and forth in an "erase" or "swipe" movement. In this regard, the user may move host device 102 in accordance with a predetermined speed and direction (velocity), such as in an up and down, side to side, or other pattern to initiate the NUC process. In this example, the use of such movements may permit the user to intuitively operate host device 102 to simulate the "erasing" of noise in captured image frames.

In another example, a NUC process may be initiated by host device 102 if motion exceeding a threshold value is detected (e.g., motion greater than expected for ordinary use). It is contemplated that any desired type of spatial translation of host device 102 may be used to initiate the NUC process.

In yet another example, a NUC process may be initiated by host device 102 if a minimum time has elapsed since a previously performed NUC process. In a further example, a NUC process may be initiated by host device 102 if infrared imaging module 100 has experienced a minimum temperature change since a previously performed NUC process. In a still further example, a NUC process may be continuously initiated and repeated.

In block 515, after a NUC process initiating event is detected, it is determined whether the NUC process should actually be performed. In this regard, the NUC process may be selectively initiated based on whether one or more additional conditions are met. For example, in one embodiment, the NUC process may not be performed unless a minimum time has elapsed since a previously performed NUC process. In another embodiment, the NUC process may not be performed unless infrared imaging module 100 has experienced a minimum temperature change since a previously performed NUC process. Other criteria or conditions may be used in other embodiments. If appropriate criteria or conditions have been met, then the flow diagram continues to block 520. Otherwise, the flow diagram returns to block 505.

In the NUC process, blurred image frames may be used to determine NUC terms which may be applied to captured image frames to correct for FPN. As discussed, in one embodiment, the blurred image frames may be obtained by accumulating multiple image frames of a moving scene (e.g., captured while the scene and/or the thermal imager is in motion). In another embodiment, the blurred image frames may be obtained by defocusing an optical element or other component of the thermal imager.

Accordingly, in block 520 a choice of either approach is provided. If the motion-based approach is used, then the flow diagram continues to block 525. If the defocus-based approach is used, then the flow diagram continues to block 530.

Referring now to the motion-based approach, in block 525 motion is detected. For example, in one embodiment, motion may be detected based on the image frames captured by infrared sensors 132. In this regard, an appropriate motion detection process (e.g., an image registration process, a frame-to-frame difference calculation, or other appropriate process) may be applied to captured image frames to determine whether motion is present (e.g., whether static or moving image frames have been captured). For example, in one embodiment, it can be determined whether pixels or regions around the pixels of consecutive image frames have changed more than a user defined amount (e.g., a percentage and/or threshold value). If at least a given percentage of pixels have changed by at least the user defined amount, then motion will be detected with sufficient certainty to proceed to block 535.

In another embodiment, motion may be determined on a per pixel basis, wherein only pixels that exhibit significant changes are accumulated to provide the blurred image frame. For example, counters may be provided for each pixel and used to ensure that the same number of pixel values are accumulated for each pixel, or used to average the pixel values based on the number of pixel values actually accumulated for each pixel. Other types of image-based motion detection may be performed such as performing a Radon transform.

In another embodiment, motion may be detected based on data provided by motion sensors 194. In one embodiment, such motion detection may include detecting whether host device 102 is moving along a relatively straight trajectory through space. For example, if host device 102 is moving along a relatively straight trajectory, then it is possible that certain objects appearing in the imaged scene may not be sufficiently blurred (e.g., objects in the scene that may be aligned with or moving substantially parallel to the straight trajectory). Thus, in such an embodiment, the motion detected by motion sensors 194 may be conditioned on host device 102 exhibiting, or not exhibiting, particular trajectories.

In yet another embodiment, both a motion detection process and motion sensors 194 may be used. Thus, using any of these various embodiments, a determination can be made as to whether or not each image frame was captured while at least a portion of the scene and host device 102 were in motion relative to each other (e.g., which may be caused by host device 102 moving relative to the scene, at least a portion of the scene moving relative to host device 102, or both).

It is expected that the image frames for which motion was detected may exhibit some secondary blurring of the captured scene (e.g., blurred thermal image data associated with the scene) due to the thermal time constants of infrared sensors 132 (e.g., microbolometer thermal time constants) interacting with the scene movement.

In block 535, image frames for which motion was detected are accumulated. For example, if motion is detected for a continuous series of image frames, then the image frames of the series may be accumulated. As another example, if motion is detected for only some image frames, then the non-moving image frames may be skipped and not included in the accumulation. Thus, a continuous or discontinuous set of image frames may be selected to be accumulated based on the detected motion.

In block 540, the accumulated image frames are averaged to provide a blurred image frame. Because the accumulated image frames were captured during motion, it is expected that actual scene information will vary between the image frames and thus cause the scene information to be further blurred in the resulting blurred image frame (block 545).

In contrast, FPN (e.g., caused by one or more components of infrared imaging module 100) will remain fixed over at least short periods of time and over at least limited changes in scene irradiance during motion. As a result, image frames captured in close proximity in time and space during motion will suffer from identical or at least very similar FPN. Thus, although scene information may change in consecutive image frames, the FPN will stay essentially constant. By averaging, multiple image frames captured during motion will blur the scene information, but will not blur the FPN. As a result, FPN will remain more clearly defined in the blurred image frame provided in block 545 than the scene information.

In one embodiment, 32 or more image frames are accumulated and averaged in blocks 535 and 540. However, any desired number of image frames may be used in other embodiments, but with generally decreasing correction accuracy as frame count is decreased.

Referring now to the defocus-based approach, in block 530, a defocus operation may be performed to intentionally defocus the image frames captured by infrared sensors 132. For example, in one embodiment, one or more actuators 199 may be used to adjust, move, or otherwise translate optical element 180, infrared sensor assembly 128, and/or other components of infrared imaging module 100 to cause infrared sensors 132 to capture a blurred (e.g., unfocused) image frame of the scene. Other non-actuator based techniques are also contemplated for intentionally defocusing infrared image frames such as, for example, manual (e.g., user-initiated) defocusing.

Although the scene may appear blurred in the image frame, FPN (e.g., caused by one or more components of infrared imaging module 100) will remain unaffected by the defocusing operation. As a result, a blurred image frame of the scene will be provided (block 545) with FPN remaining more clearly defined in the blurred image than the scene information.

In the above discussion, the defocus-based approach has been described with regard to a single captured image frame. In another embodiment, the defocus-based approach may include accumulating multiple image frames while the infrared imaging module 100 has been defocused and averaging the defocused image frames to remove the effects of temporal noise and provide a blurred image frame in block 545.

Thus, it will be appreciated that a blurred image frame may be provided in block 545 by either the motion-based approach or the defocus-based approach. Because much of the scene information will be blurred by either motion, defocusing, or both, the blurred image frame may be effectively considered a low pass filtered version of the original captured image frames with respect to scene information.

In block 550, the blurred image frame is processed to determine updated row and column FPN terms (e.g., if row and column FPN terms have not been previously determined then the updated row and column FPN terms may be new row and column FPN terms in the first iteration of block 550). As used in this disclosure, the terms row and column may be used interchangeably depending on the orientation of infrared sensors 132 and/or other components of infrared imaging module 100.

In one embodiment, block 550 includes determining a spatial FPN correction term for each row of the blurred image frame (e.g., each row may have its own spatial FPN correction term), and also determining a spatial FPN correction term for each column of the blurred image frame (e.g., each column may have its own spatial FPN correction term). Such processing may be used to reduce the spatial and slowly varying (1/f) row and column FPN inherent in thermal imagers caused by, for example, 1/f noise characteristics of amplifiers in ROIC 402 which may manifest as vertical and horizontal stripes in image frames.

Advantageously, by determining spatial row and column FPN terms using the blurred image frame, there will be a reduced risk of vertical and horizontal objects in the actual imaged scene from being mistaken for row and column noise (e.g., real scene content will be blurred while FPN remains unblurred).

Figure 6:
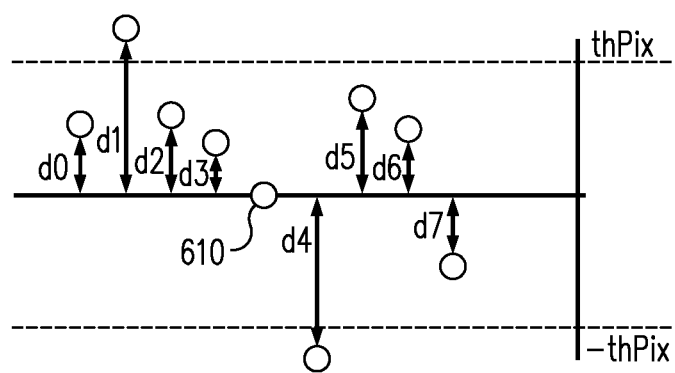
FIG. 6 illustrates differences between neighboring pixels in accordance with an embodiment of the disclosure.

In one embodiment, row and column FPN terms may be determined by considering differences between neighboring pixels of the blurred image frame. For example, FIG. 6 illustrates differences between neighboring pixels in accordance with an embodiment of the disclosure. Specifically, in FIG. 6 a pixel 610 is compared to its 8 nearest horizontal neighbors: d0-d3 on one side and d4-d7 on the other side. Differences between the neighbor pixels can be averaged to obtain an estimate of the offset error of the illustrated group of pixels. An offset error may be calculated for each pixel in a row or column and the average result may be used to correct the entire row or column.

To prevent real scene data from being interpreted as noise, upper and lower threshold values may be used (thPix and −thPix). Pixel values falling outside these threshold values (pixels d1 and d4 in this example) are not used to obtain the offset error. In addition, the maximum amount of row and column FPN correction may be limited by these threshold values.

Further techniques for performing spatial row and column FPN correction processing are set forth in U.S. patent application Ser. No. 12/396,340 filed Mar. 2, 2009 which is incorporated herein by reference in its entirety.

Referring again to FIG. 5, the updated row and column FPN terms determined in block 550 are stored (block 552) and applied (block 555) to the blurred image frame provided in block 545. After these terms are applied, some of the spatial row and column FPN in the blurred image frame may be reduced. However, because such terms are applied generally to rows and columns, additional FPN may remain such as spatially uncorrelated FPN associated with pixel to pixel drift or other causes. Neighborhoods of spatially correlated FPN may also remain which may not be directly associated with individual rows and columns. Accordingly, further processing may be performed as discussed below to determine NUC terms.

In block 560, local contrast values (e.g., edges or absolute values of gradients between adjacent or small groups of pixels) in the blurred image frame are determined. If scene information in the blurred image frame includes contrasting areas that have not been significantly blurred (e.g., high contrast edges in the original scene data), then such features may be identified by a contrast determination process in block 560.

For example, local contrast values in the blurred image frame may be calculated, or any other desired type of edge detection process may be applied to identify certain pixels in the blurred image as being part of an area of local contrast. Pixels that are marked in this manner may be considered as containing excessive high spatial frequency scene information that would be interpreted as FPN (e.g., such regions may correspond to portions of the scene that have not been sufficiently blurred). As such, these pixels may be excluded from being used in the further determination of NUC terms. In one embodiment, such contrast detection processing may rely on a threshold that is higher than the expected contrast value associated with FPN (e.g., pixels exhibiting a contrast value higher than the threshold may be considered to be scene information, and those lower than the threshold may be considered to be exhibiting FPN).

In one embodiment, the contrast determination of block 560 may be performed on the blurred image frame after row and column FPN terms have been applied to the blurred image frame (e.g., as shown in FIG. 5). In another embodiment, block 560 may be performed prior to block 550 to determine contrast before row and column FPN terms are determined (e.g., to prevent scene based contrast from contributing to the determination of such terms).

Following block 560, it is expected that any high spatial frequency content remaining in the blurred image frame may be generally attributed to spatially uncorrelated FPN. In this regard, following block 560, much of the other noise or actual desired scene based information has been removed or excluded from the blurred image frame due to: intentional blurring of the image frame (e.g., by motion or defocusing in blocks 520 through 545), application of row and column FPN terms (block 555), and contrast determination (block 560).

Thus, it can be expected that following block 560, any remaining high spatial frequency content (e.g., exhibited as areas of contrast or differences in the blurred image frame) may be attributed to spatially uncorrelated FPN. Accordingly, in block 565, the blurred image frame is high pass filtered. In one embodiment, this may include applying a high pass filter to extract the high spatial frequency content from the blurred image frame. In another embodiment, this may include applying a low pass filter to the blurred image frame and taking a difference between the low pass filtered image frame and the unfiltered blurred image frame to obtain the high spatial frequency content. In accordance with various embodiments, of the present disclosure, a high pass filter may be implemented by calculating a mean difference between a sensor signal (e.g., a pixel value) and its neighbors.

In block 570, a flat field correction process is performed on the high pass filtered blurred image frame to determine updated NUC terms (e.g., if a NUC process has not previously been performed then the updated NUC terms may be new NUC terms in the first iteration of block 570).

Figure 7:
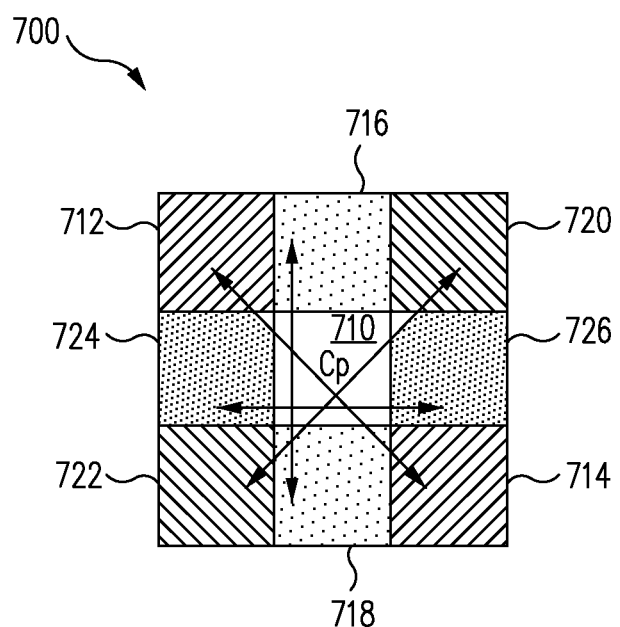
FIG. 7 illustrates a flat field correction technique in accordance with an embodiment of the disclosure.

For example, FIG. 7 illustrates a flat field correction technique 700 in accordance with an embodiment of the disclosure. In FIG. 7, a NUC term may be determined for each pixel 710 of the blurred image frame using the values of its neighboring pixels 712 to 726. For each pixel 710, several gradients may be determined based on the absolute difference between the values of various adjacent pixels. For example, absolute value differences may be determined between: pixels 712 and 714 (a left to right diagonal gradient), pixels 716 and 718 (a top to bottom vertical gradient), pixels 720 and 722 (a tight to left diagonal gradient), and pixels 724 and 726 (a left to right horizontal gradient).

These absolute differences may be summed to provide a summed gradient for pixel 710. A weight value may be determined for pixel 710 that is inversely proportional to the summed gradient. This process may be performed for all pixels 710 of the blurred image frame until a weight value is provided for each pixel 710. For areas with low gradients (e.g., areas that are blurry or have low contrast), the weight value will be close to one. Conversely, for areas with high gradients, the weight value will be zero or close to zero. The update to the NUC term as estimated by the high pass filter is multiplied with the weight value.

In one embodiment, the risk of introducing scene information into the NUC terms can be further reduced by applying some amount of temporal damping to the NUC term determination process. For example, a temporal damping factor $\lambda$ between 0 and 1 may be chosen such that the new NUC term ($NUC_{NEW}$) stored is a weighted average of the old NUC term ($NUC_{OLD}$) and the estimated updated NUC term ($NUC_{UPDATE}$). In one embodiment, this can be expressed as $NUC_{NEW} = \lambda \cdot NUC_{OLD} + (1-\lambda) \cdot (NUC_{OLD} + NUC_{UPDATE})$.

Although the determination of NUC terms has been described with regard to gradients, local contrast values may be used instead where appropriate. Other techniques may also be used such as, for example, standard deviation calculations. Other types flat field correction processes may be performed to determine NUC terms including, for example, various processes identified in U.S. Pat. No. 6,028,309 issued Feb. 22, 2000, U.S. Pat. No. 6,812,465 issued Nov. 2, 2004, and U.S. patent application Ser. No. 12/114,865 filed May 5, 2008, which are incorporated herein by reference in their entirety.

Referring again to FIG. 5, block 570 may include additional processing of the NUC terms. For example, in one embodiment, to preserve the scene signal mean, the sum of all NUC terms may be normalized to zero by subtracting the NUC term mean from each NUC term. Also in block 570, to avoid row and column noise from affecting the NUC terms, the mean value of each row and column may be subtracted from the NUC terms for each row and column. As a result, row and column FPN filters using the row and column FPN terms determined in block 550 may be better able to filter out row and column noise in further iterations (e.g., as further shown in FIG. 8) after the NUC terms are applied to captured images (e.g., in block 580 further discussed herein). In this regard, the row and column FPN filters may in general use more data to calculate the per row and per column offset coefficients (e.g., row and column FPN terms) and may thus provide a more robust alternative for reducing spatially cor-related FPN than the NUC terms which are based on high pass filtering to capture spatially uncorrelated noise.

In blocks 571-573, additional high pass filtering and further determinations of updated NUC terms may be optionally performed to remove spatially correlated FPN with lower spatial frequency than previously removed by row and column FPN terms. In this regard, some variability in infrared sensors 132 or other components of infrared imaging module 100 may result in spatially correlated FPN noise that cannot be easily modeled as row or column noise. Such spatially correlated FPN may include, for example, window defects on a sensor package or a cluster of infrared sensors 132 that respond differently to irradiance than neighboring infrared sensors 132. In one embodiment, such spatially correlated FPN may be mitigated with an offset correction. If the amount of such spatially correlated FPN is significant, then the noise may also be detectable in the blurred image frame. Since this type of noise may affect a neighborhood of pixels, a high pass filter with a small kernel may not detect the FPN in the neighborhood (e.g., all values used in high pass filter may be taken from the neighborhood of affected pixels and thus may be affected by the same offset error). For example, if the high pass filtering of block 565 is performed with a small kernel (e.g., considering only immediately adjacent pixels that fall within a neighborhood of pixels affected by spatially correlated FPN), then broadly distributed spatially correlated FPN may not be detected.

Figure 11:
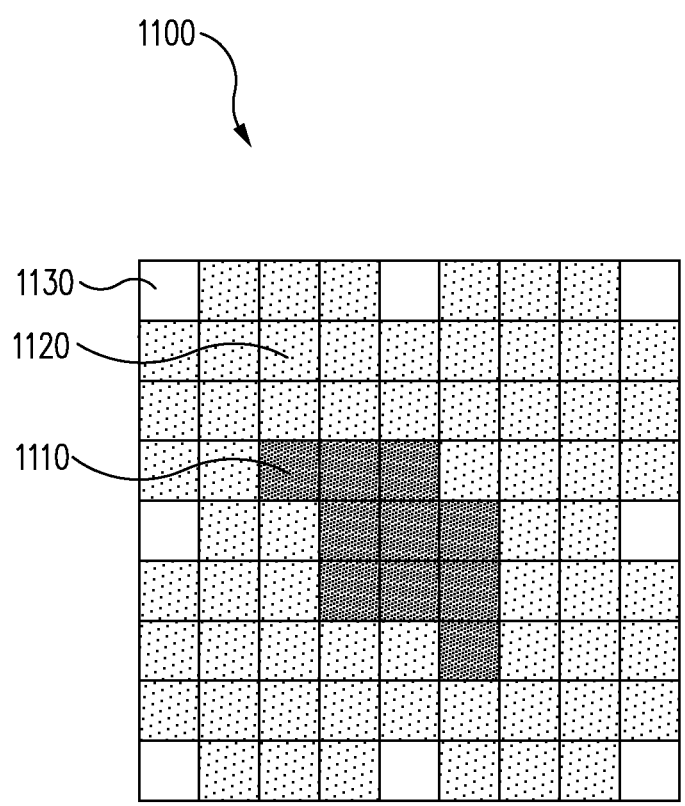
FIG. 11 illustrates spatially correlated fixed pattern noise (FPN) in a neighborhood of pixels in accordance with an embodiment of the disclosure.

For example, FIG. 11 illustrates spatially correlated FPN in a neighborhood of pixels in accordance with an embodiment of the disclosure. As shown in a sample image frame 1100, a neighborhood of pixels 1110 may exhibit spatially correlated FPN that is not precisely correlated to individual rows and columns and is distributed over a neighborhood of several pixels (e.g., a neighborhood of approximately 4 by 4 pixels in this example). Sample image frame 1100 also includes a set of pixels 1120 exhibiting substantially uniform response that are not used in filtering calculations, and a set of pixels 1130 that are used to estimate a low pass value for the neighborhood of pixels 1110. In one embodiment, pixels 1130 may be a number of pixels divisible by two in order to facilitate efficient hardware or software calculations.

Referring again to FIG. 5, in blocks 571-573, additional high pass filtering and further determinations of updated NUC terms may be optionally performed to remove spatially correlated FPN such as exhibited by pixels 1110. In block 571, the updated NUC terms determined in block 570 are applied to the blurred image frame. Thus, at this time, the blurred image frame will have been initially corrected for spatially correlated FPN (e.g., by application of the updated row and column FPN terms in block 555), and also initially corrected for spatially uncorrelated FPN (e.g., by application of the updated NUC terms applied in block 571).

In block 572, a further high pass filter is applied with a larger kernel than was used in block 565, and further updated NUC terms may be determined in block 573. For example, to detect the spatially correlated FPN present in pixels 1110, the high pass filter applied in block 572 may include data from a sufficiently large enough neighborhood of pixels such that differences can be determined between unaffected pixels (e.g., pixels 1120) and affected pixels (e.g., pixels 1110). For example, a low pass filter with a large kernel can be used (e.g., an N by N kernel that is much greater than 3 by 3 pixels) and the results may be subtracted to perform appropriate high pass filtering.

In one embodiment, for computational efficiency, a sparse kernel may be used such that only a small number of neighboring pixels inside an N by N neighborhood are used. For any given high pass filter operation using distant neighbors (e.g., a large kernel), there is a risk of modeling actual (potentially blurred) scene information as spatially correlated FPN. Accordingly, in one embodiment, the temporal damping factor λ may be set close to 1 for updated NUC terms determined in block 573.

In various embodiments, blocks 571-573 may be repeated (e.g., cascaded) to iteratively perform high pass filtering with increasing kernel sizes to provide further updated NUC terms further correct for spatially correlated FPN of desired neighborhood sizes. In one embodiment, the decision to perform such iterations may be determined by whether spatially correlated FPN has actually been removed by the updated NUC terms of the previous performance of blocks 571-573.

After blocks 571-573 are finished, a decision is made regarding whether to apply the updated NUC terms to captured image frames (block 574). For example, if an average of the absolute value of the NUC terms for the entire image frame is less than a minimum threshold value, or greater than a maximum threshold value, the NUC terms may be deemed spurious or unlikely to provide meaningful correction. Alternatively, thresholding criteria may be applied to individual pixels to determine which pixels receive updated NUC terms. In one embodiment, the threshold values may correspond to differences between the newly calculated NUC terms and previously calculated NUC terms. In another embodiment, the threshold values may be independent of previously calculated NUC terms. Other tests may be applied (e.g., spatial correlation tests) to determine whether the NUC terms should be applied.

If the NUC terms are deemed spurious or unlikely to provide meaningful correction, then the flow diagram returns to block 505. Otherwise, the newly determined NUC terms are stored (block 575) to replace previous NUC terms (e.g., determined by a previously performed iteration of FIG. 5) and applied (block 580) to captured image frames.

Figure 8:
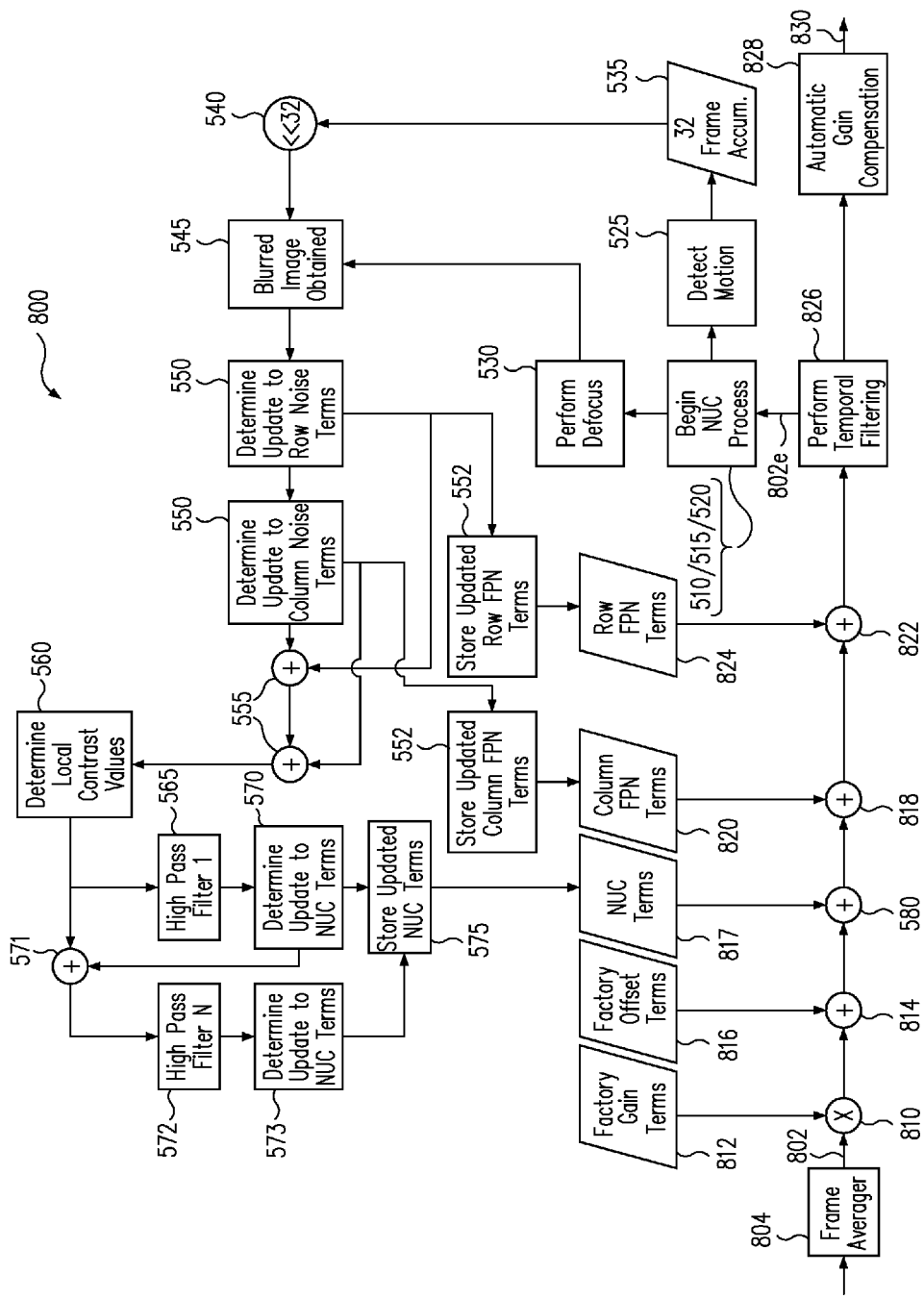
FIG. 8 illustrates various image processing techniques of FIG. 5 and other operations applied in an image processing pipeline in accordance with an embodiment of the disclosure.

FIG. 8 illustrates various image processing techniques of FIG. 5 and other operations applied in an image processing pipeline 800 in accordance with an embodiment of the disclosure. In this regard, pipeline 800 identifies various operations of FIG. 5 in the context of an overall iterative image processing scheme for correcting image frames provided by infrared imaging module 100. In some embodiments, pipeline 800 may be provided by processing module 160 or processor 195 (both also generally referred to as a processor) operating on image frames captured by infrared sensors 132.

Image frames captured by infrared sensors 132 may be provided to a frame averager 804 that integrates multiple image frames to provide image frames 802 with an improved signal to noise ratio. Frame averager 804 may be effectively provided by infrared sensors 132, ROIC 402, and other components of infrared sensor assembly 128 that are implemented to support high image capture rates. For example, in one embodiment, infrared sensor assembly 128 may capture infrared image frames at a frame rate of 240 Hz (e.g., 240 images per second). In this embodiment, such a high frame rate may be implemented, for example, by operating infrared sensor assembly 128 at relatively low voltages (e.g., compatible with mobile telephone voltages) and by using a relatively small array of infrared sensors 132 (e.g., an array of 64 by 64 infrared sensors in one embodiment).

In one embodiment, such infrared image frames may be provided from infrared sensor assembly 128 to processing module 160 at a high frame rate (e.g., 240 Hz or other frame rates). In another embodiment, infrared sensor assembly 128 may integrate over longer time periods, or multiple time periods, to provide integrated (e.g., averaged) infrared image frames to processing module 160 at a lower frame rate (e.g., 30 Hz, 9 Hz, or other frame rates). Further information regarding implementations that may be used to provide high image capture rates may be found in U.S. Provisional Patent Application No. 61/495,879 previously referenced herein.

Image frames 802 proceed through pipeline 800 where they are adjusted by various terms, temporally filtered, used to determine the various adjustment terms, and gain compensated.

In blocks 810 and 814, factory gain terms 812 and factory offset terms 816 are applied to image frames 802 to compensate for gain and offset differences, respectively, between the various infrared sensors 132 and/or other components of infrared imaging module 100 determined during manufacturing and testing.

In block 580, NUC terms 817 are applied to image frames 802 to correct for FPN as discussed. In one embodiment, if NUC terms 817 have not yet been determined (e.g., before a NUC process has been initiated), then block 580 may not be performed or initialization values may be used for NUC terms 817 that result in no alteration to the image data (e.g., offsets for every pixel would be equal to zero).

In blocks 818 and 822, column FPN terms 820 and row FPN terms 824, respectively, are applied to image frames 802. Column FPN terms 820 and row FPN terms 824 may be determined in accordance with block 550 as discussed. In one embodiment, if the column FPN terms 820 and row FPN terms 824 have not yet been determined (e.g., before a NUC process has been initiated), then blocks 818 and 822 may not be performed or initialization values may be used for the column FPN terms 820 and row FPN terms 824 that result in no alteration to the image data (e.g., offsets for every pixel would be equal to zero).

Figure 9:
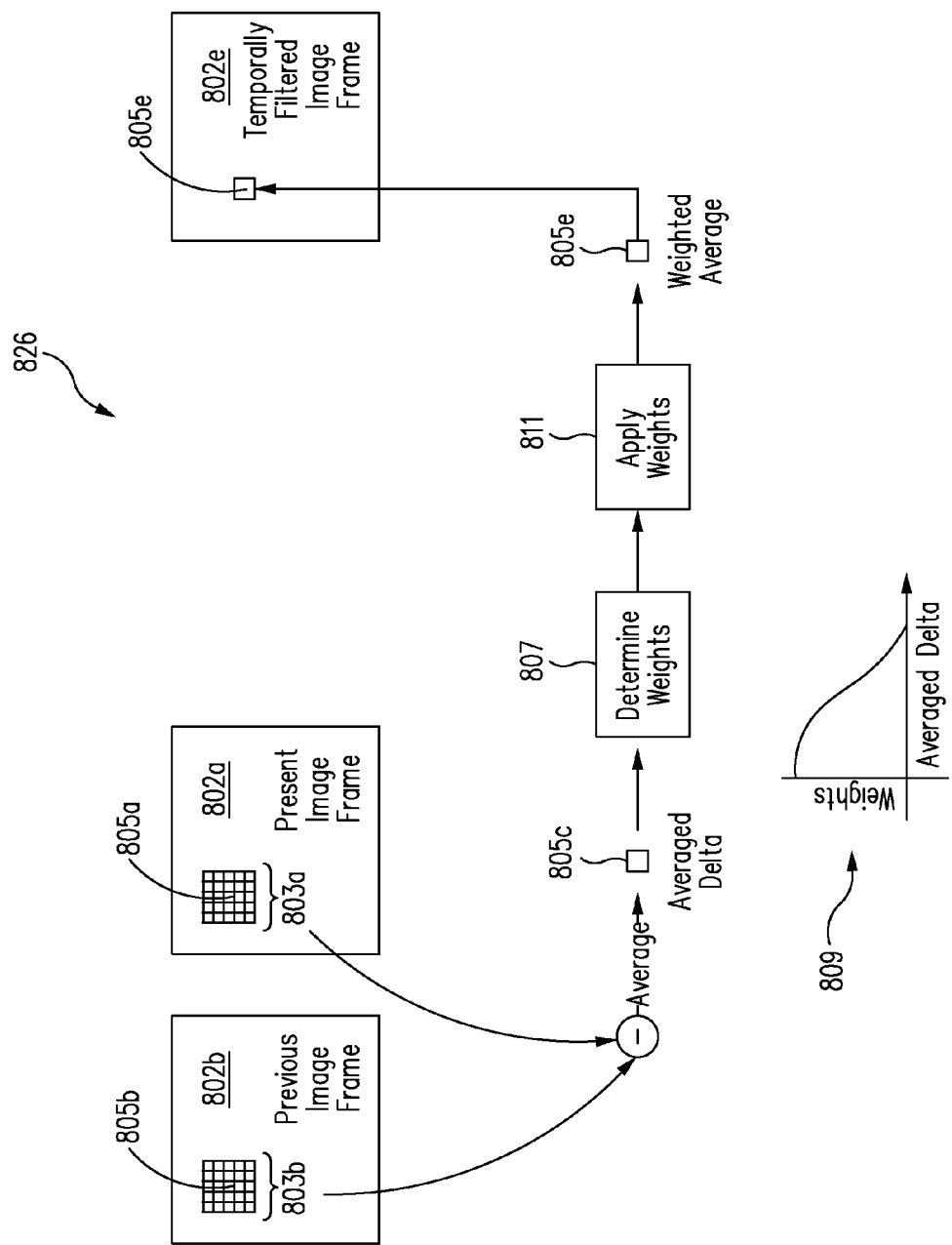
FIG. 9 illustrates a temporal noise reduction process in accordance with an embodiment of the disclosure.

In block 826, temporal filtering is performed on image frames 802 in accordance with a temporal noise reduction (TNR) process. FIG. 9 illustrates a TNR process in accordance with an embodiment of the disclosure. In FIG. 9, a presently received image frame 802*a* and a previously temporally filtered image frame 802*b* are processed to determine a new temporally filtered image frame 802*e*. Image frames 802*a* and 802*b* include local neighborhoods of pixels 803*a* and 803*b* centered around pixels 805*a* and 805*b*, respectively. Neighborhoods 803*a* and 803*b* correspond to the same locations within image frames 802*a* and 802*b* and are subsets of the total pixels in image frames 802*a* and 802*b*. In the illustrated embodiment, neighborhoods 803*a* and 803*b* include areas of 5 by 5 pixels. Other neighborhood sizes may be used in other embodiments.

Differences between corresponding pixels of neighborhoods 803*a* and 803*b* are determined and averaged to provide an averaged delta value 805*c* for the location corresponding to pixels 805*a* and 805*b*. Averaged delta value 805*c* may be used to determine weight values in block 807 to be applied to pixels 805*a* and 805*b* of image frames 802*a* and 802*b*.

In one embodiment, as shown in graph 809, the weight values determined in block 807 may be inversely proportional to averaged delta value 805*c* such that weight values drop rapidly towards zero when there are large differences between neighborhoods 803*a* and 803*b*. In this regard, large differences between neighborhoods 803*a* and 803*b* may indicate that changes have occurred within the scene (e.g., due to motion) and pixels 802*a* and 802*b* may be appropriately weighted, in one embodiment, to avoid introducing blur across frame-to-frame scene changes. Other associations between weight values and averaged delta value 805*c* may be used in various embodiments.

The weight values determined in block 807 may be applied to pixels 805a and 805b to determine a value for corresponding pixel 805e of image frame 802e (block 811). In this regard, pixel 805e may have a value that is a weighted average (or other combination) of pixels 805a and 805b, depending on averaged delta value 805c and the weight values determined in block 807.

For example, pixel 805e of temporally filtered image frame 802e may be a weighted sum of pixels 805a and 805b of image frames 802a and 802b. If the average difference between pixels 805a and 805b is due to noise, then it may be expected that the average change between neighborhoods 805a and 805b will be close to zero (e.g., corresponding to the average of uncorrelated changes). Under such circumstances, it may be expected that the sum of the differences between neighborhoods 805a and 805b will be close to zero. In this case, pixel 805a of image frame 802a may both be appropriately weighted so as to contribute to the value of pixel 805e.

However, if the sum of such differences is not zero (e.g., even differing from zero by a small amount in one embodiment), then the changes may be interpreted as being attributed to motion instead of noise. Thus, motion may be detected based on the average change exhibited by neighborhoods 805a and 805b. Under these circumstances, pixel 805a of image frame 802a may be weighted heavily, while pixel 805b of image frame 802b may be weighted lightly.

Other embodiments are also contemplated. For example, although averaged delta value 805c has been described as being determined based on neighborhoods 805a and 805b, in other embodiments averaged delta value 805c may be determined based on any desired criteria (e.g., based on individual pixels or other types of groups of sets of pixels).

In the above embodiments, image frame 802a has been described as a presently. received image frame and image frame 802b has been described as a previously temporally filtered image frame. In another embodiment, image frames 802a and 802b may be first and second image frames captured by infrared imaging module 100 that have not been temporally filtered.

Figure 10:
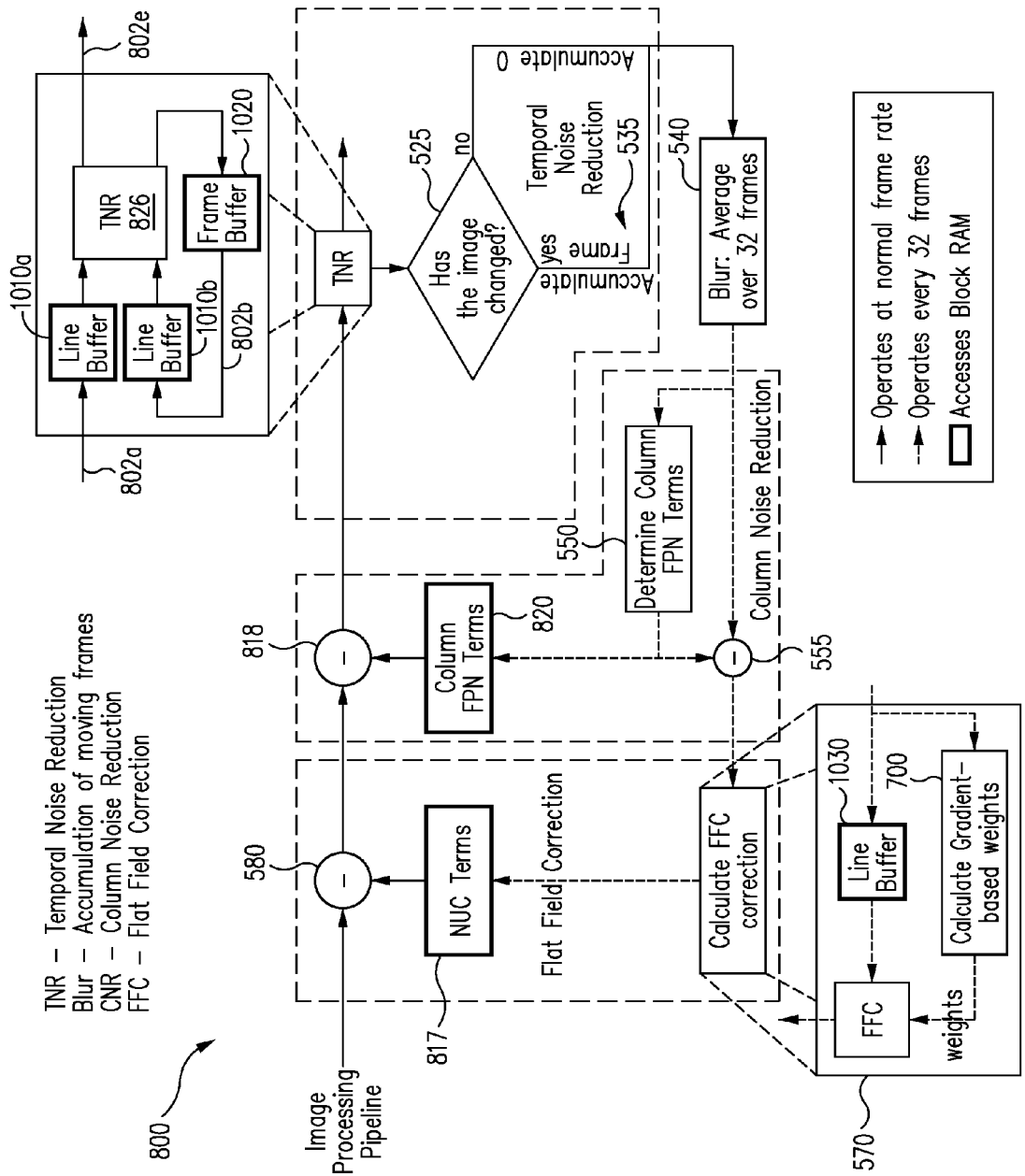
FIG. 10 illustrates particular implementation details of several processes of the image processing pipeline of FIG. 8 in accordance with an embodiment of the disclosure.

FIG. 10 illustrates further implementation details in relation to the TNR process of block 826. As shown in FIG. 10, image frames 802a and 802b may be read into line buffers 1010a and 1010b, respectively, and image frame 802b (e.g., the previous image frame) may be stored in a frame buffer 1020 before being read into line buffer 1010b. In one embodiment, line buffers 1010a-b and frame buffer 1020 may be implemented by a block of random access memory (RAM) provided by any appropriate component of infrared imaging module 100 and/or host device 102.

Referring again to FIG. 8, image frame 802e may be passed to an automatic gain compensation block 828 for further processing to provide a result image frame 830 that may be used by host device 102 as desired.

FIG. 8 further illustrates various operations that may be performed to determine row and column FPN terms and NUC terms as discussed. In one embodiment, these operations may use image frames 802e as shown in FIG. 8. Because image frames 802e have already been temporally filtered, at least some temporal noise may be removed and thus will not inadvertently affect the determination of row and column FPN terms 824 and 820 and NUC terms 817. In another embodiment, non-temporally filtered image frames 802 may be used.

In FIG. 8, blocks 510, 515, and 520 of FIG. 5 are collectively represented together. As discussed, a NUC process may be selectively initiated and performed in response to various NUC process initiating events and based on various criteria or conditions. As also discussed, the NUC process may be performed in accordance with a motion-based approach (blocks 525, 535, and 540) or a defocus-based approach (block 530) to provide a blurred image frame (block 545). FIG. 8 further illustrates various additional blocks 550, 552, 555, 560, 565, 570, 571, 572, 573, and 575 previously discussed with regard to FIG. 5.

As shown in FIG. 8, row and column FPN terms 824 and 820 and NUC terms 817 may be determined and applied in an iterative fashion such that updated terms are determined using image frames 802 to which previous terms have already been applied. As a result, the overall process of FIG. 8 may repeatedly update and apply such terms to continuously reduce the noise in image frames 830 to be used by host device 102.

Referring again to FIG. 10, further implementation details are illustrated for various blocks of FIGS. 5 and 8 in relation to pipeline 800. For example, blocks 525, 535, and 540 are shown as operating at the normal frame rate of image frames 802 received by pipeline 800. In the embodiment shown in FIG. 10, the determination made in block 525 is represented as a decision diamond used to determine whether a given image frame 802 has sufficiently changed such that it may be considered an image frame that will enhance the blur if added to other image frames and is therefore accumulated (block 535 is represented by an arrow in this embodiment) and averaged (block 540).

Also in FIG. 10, the determination of column FPN terms 820 (block 550) is shown as operating at an update rate that in this example is 1/32 of the sensor frame rate (e.g., normal frame rate) due to the averaging performed in block 540. Other update rates may be used in other embodiments. Although only column FPN terms 820 are identified in FIG. 10, row FPN terms 824 may be implemented in a similar fashion at the reduced frame rate.

FIG. 10 also illustrates further implementation details in relation to the NUC determination process of block 570. In this regard, the blurred image frame may be read to a line buffer 1030 (e.g., implemented by a block of RAM provided by any appropriate component of infrared imaging module 100 and/or host device 102). The flat field correction. technique 700 of FIG. 7 may be performed on the blurred image frame.

In view of the present disclosure, it will be appreciated that techniques described herein may be used to remove various types of FPN (e.g., including very high amplitude FPN) such as spatially correlated row and column FPN and spatially uncorrelated FPN.

Other embodiments are also contemplated. For example, in one embodiment, the rate at which row and column FPN terms and/or NUC terms are updated can be inversely proportional to the estimated amount of blur in the blurred image frame and/or inversely proportional to the magnitude of local contrast values (e.g., determined in block 560).

In various embodiments, the described techniques may provide advantages over conventional shutter-based noise correction techniques. For example, by using a shutterless process, a shutter (e.g., such as shutter 105) need not be provided, thus permitting reductions in size, weight, cost, and mechanical complexity. Power and maximum voltage supplied to, or generated by, infrared imaging module 100 may also be reduced if a shutter does not need to be mechanically operated. Reliability will be improved by removing the shutter as a potential point of failure. A shutterless process also eliminates potential image interruption caused by the temporary blockage of the imaged scene by a shutter.

Also, by correcting for noise using intentionally blurred image frames captured from a real world scene (not a uniform scene provided by a shutter), noise correction may be performed on image frames that have irradiance levels similar to those of the actual scene desired to be imaged. This can improve the accuracy and effectiveness of noise correction terms determined in accordance with the various described techniques.

Figure 12:
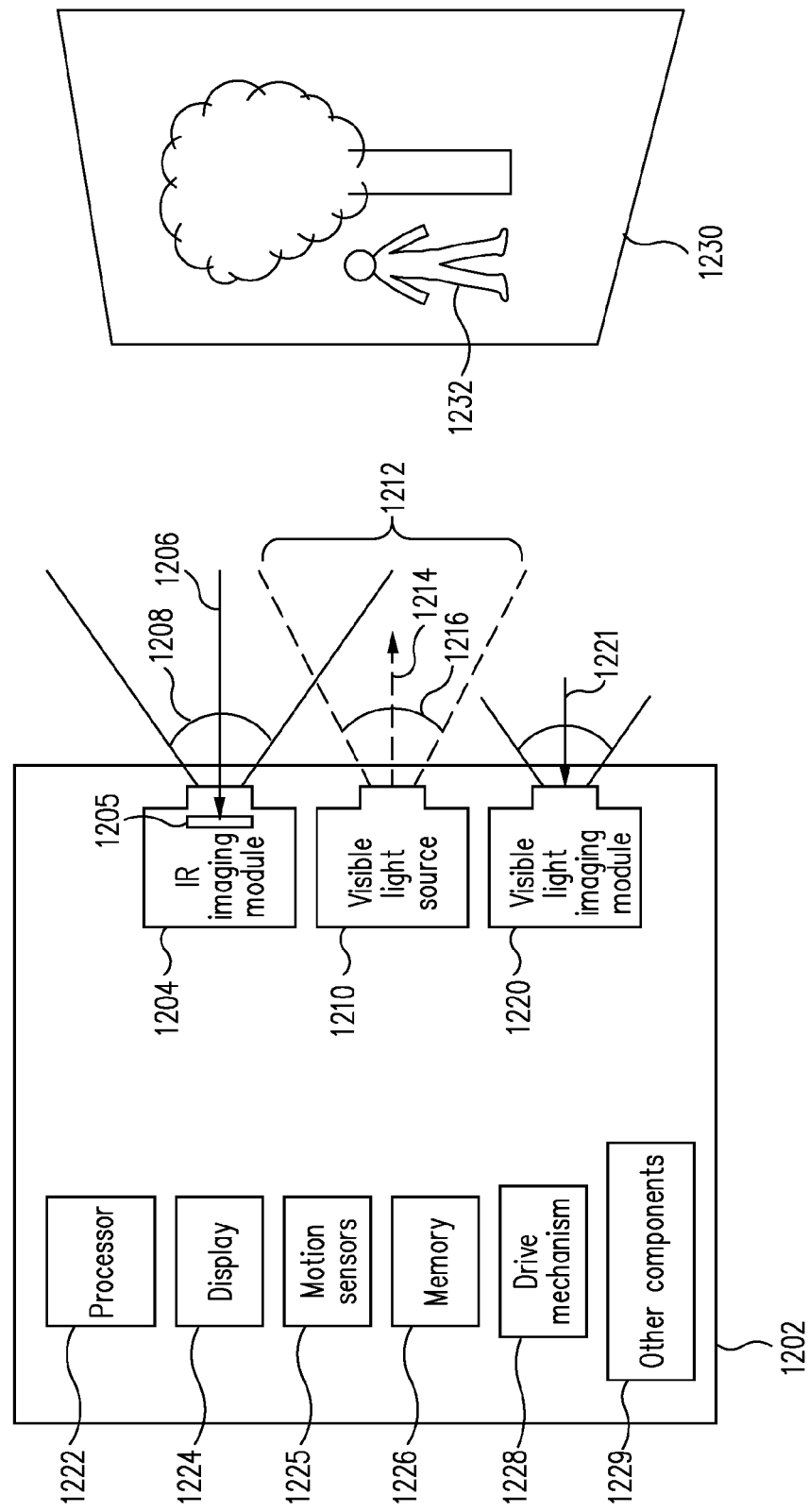
FIG. 12 illustrates a block diagram of a system having an infrared imaging module used to align a visible light source in accordance with an embodiment of the disclosure.

FIG. 12 illustrates a block diagram of a system 1202, having an infrared imaging module 1204 used to align a visible light source 1210 in accordance with an embodiment of the disclosure. System 1202 may include infrared imaging module 1204, visible light source 1210, a visible light imaging module 1220, a processor 1222, a display 1224, motion sensors 1225, a memory 1226, a drive mechanism 1228 (e.g., a motor, an actuator, and/or other appropriate machine), and other components 1229. In one embodiment, the various components of system 1202 may be implemented in the same or similar manner as corresponding components of host device 102 of FIG. 1. Moreover, the various components of system 1202 may be configured to perform various NUC processes and other processes described herein.

Infrared imaging module 1204 may be a small form factor infrared camera or a small form factor infrared imaging device implemented in accordance with various embodiments disclosed herein. Infrared imaging module 1204 may be configured to capture, process, and/or otherwise manage infrared images (e.g., including thermal images) of a scene 1230, and provide such images to processor 1222.

Infrared imaging module 1204 may include an FPA 1205 implemented, for example, in accordance with various embodiments disclosed herein or others where appropriate. Infrared imaging module 1204 may define an optical axis 1206 substantially perpendicular to FPA 1205 and between scene 1230 and infrared imaging module 1204. Infrared imaging module 1204 may also have a field of view (FOV) 1208, defining the area or solid angle associated with images captured by infrared imaging module 1204.

In various embodiments, visible light source 1210 may be implemented with an electric lamp, an arc lamp, a solid-state electronic light (e.g., LED light), an electronic flashtube (e.g., a strobe used in flash photography), a laser, and/or various other lamps or light emitting sources known in the art. Visible light source 1210 may also be implemented with various lenses, reflectors, and/or other optical elements to form a visible light beam 1212 having an optical axis 1214 and a beam angle 1216. Optionally, visible light source 1210 may be implemented with a focused light source capable of forming a visible light beam without the aid of optical elements.

Visible light source 1210 may be configured to be selectively directed to align visible light source 1210 with a desired subject 1232 and project a visible light beam substantially along optical axis 1214 and substantially on subject 1232. Visible light source 1210 may be configured to selectively project visible light beam 1212 when desired, for example, while visible light source 1210 is substantially aligned with subject 1232.

In some embodiments, infrared imaging module 1204 may be oriented so that optical axis 1206 of infrared imaging module 1204 is substantially parallel to visible light beam 1212 projected from visible light source 1210. In such embodiments, the center of scene 1230 may substantially coincide with the center of visible light beam 1212 in thermal images captured by infrared imaging module 1204. Optionally in such embodiments, parallax error correction techniques may be employed where appropriate, so that the center of scene 1230 may more accurately coincide with the center of visible light beam 1212 in thermal images captured by infrared imaging module 1204.

In some embodiments, FOV 1208 of infrared imaging module 1204 may be larger than beam angle 1216 of visible light beam 1212 projected from visible light source 1210. In such embodiments, scene 1230 in thermal images capture by infrared imaging module 1204 and processed by processor 1222, may cover an area larger than an area to be illuminated by visible light beam 1212. This allows system 1202 to generate and provide alignment guide information which may be used to selectively direct visible light source 1210 (and thus direct visible light beam 1212) to illuminate a desired portion of scene 1230, such as subject 1232.

Visible light imaging module 1220 may be implemented with a CCD sensor, a CMOS sensor, and/or other appropriate image sensors to capture visible light images. In some embodiments, visible light imaging module 1220 may be oriented so that an optical axis 1221 of visible light imaging module 1220 is substantially parallel to visible light beam 1212 and/or optical axis 1206 of infrared imaging module 1204.

In some embodiments, a thermal image captured by infrared imaging module 1204 may be superimposed on a visible light image captured by visible light imaging module 1220 for viewing by a user on display 1224.

Processor 1222 may be implemented as any appropriate processing device as described with regard to processor 195 in FIG. 1. In some embodiments, at least some part of processor 1222 may be implemented as part of infrared imaging module 1204.

Processor 1222 may be configured to receive one or more thermal images captured by infrared imaging module 1204, and to process the thermal image to generate alignment guide information for aligning visible light source 1210 with subject 1232. In one embodiment, alignment guide information generated by processor 1222 may include an image (e.g., a thermogram) of scene 1230 based on a thermal image captured by infrared imaging module 1204. A user or machine may, for example, selectively direct visible light source 1210 even in darkness based on the image of scene 1230, and then project a visible light beam on a desired subject when visible light source 1210 is aligned as desired.

In another embodiment, alignment guide information generated by processor 1222 may include a framing reticle overlaid on a user-viewable image based on a thermal image of scene 1230 captured by infrared imaging module 1204. A framing reticle may indicate substantially the center of visible light beam 1212 and/or a corresponding area of scene 1230 to be illuminated by visible light beam 1212.

In another embodiment, alignment guide information generated by processor 1222 may include a user-viewable cue indicating how visible light source 1210 should be directed to project visible light beam 1212 on subject 1232. For example, processor 1222 may detect subject 1232 in a thermal image captured by infrared imaging module 1204, determine the location of subject 1232 relative to an area to be illuminated by a visible light beam projected from visible light source 1210, and generate directional information indicating a direction in which visible light source 1210 should be panned, tilted, and/or otherwise directed in order to project visible light beam 1212 on subject 1232. In this regard, a user-viewable cue may be presented as text, a graphic (e.g., as a directional arrow or otherwise), and/or any other appropriate representation. In other embodiments, such a cue may be presented in an audible form in addition to, or instead of, a user-viewable form.

Display 1224 may be used to present to a user the alignment guide information generated by processor 1222. Motion sensors 1225 may be implemented in the same or similar manner as described with regard to motion sensors 194 in FIG. 1. Motion sensors 1225 may be monitored by and provide information to infrared imaging module 1204 and/or processor 1222 for performing various NUC techniques described herein. Other components 1229 may be used to implement any feature (e.g., parallax correction, auto focus, beam angle control, light intensity control, and/or others) as may be desired for various applications of system 1202.

In some embodiments, drive mechanism 1228 (e.g., motors or actuators) may be configured to provide a force for selectively directing visible light source 1210 to align visible light source 1210 with a desired subject. In such embodiments, various components of system 1202, including processor 1222, may be further configured to provide input signals and/or data to drive mechanism 1228 for automatically aligning visible light source 1210 without direction by a human operator. For example, processor 1222 may detect subject 1232 in a thermal image captured by infrared imaging module 1204, determine the location of subject 1232 relative to an area to be illuminated by visible light beam 1212 projected from visible light source 1210, and generate input signals and/or data for drive mechanism 122 to pan, tilt, and/or otherwise direct visible light source 1210 in a desired direction for aligning visible light source 1210 with subject 1232. It will be appreciated that input signals and/or data for drive mechanism 1228 may also be generated based at least in part on other alignment guide information.

Figure 13:
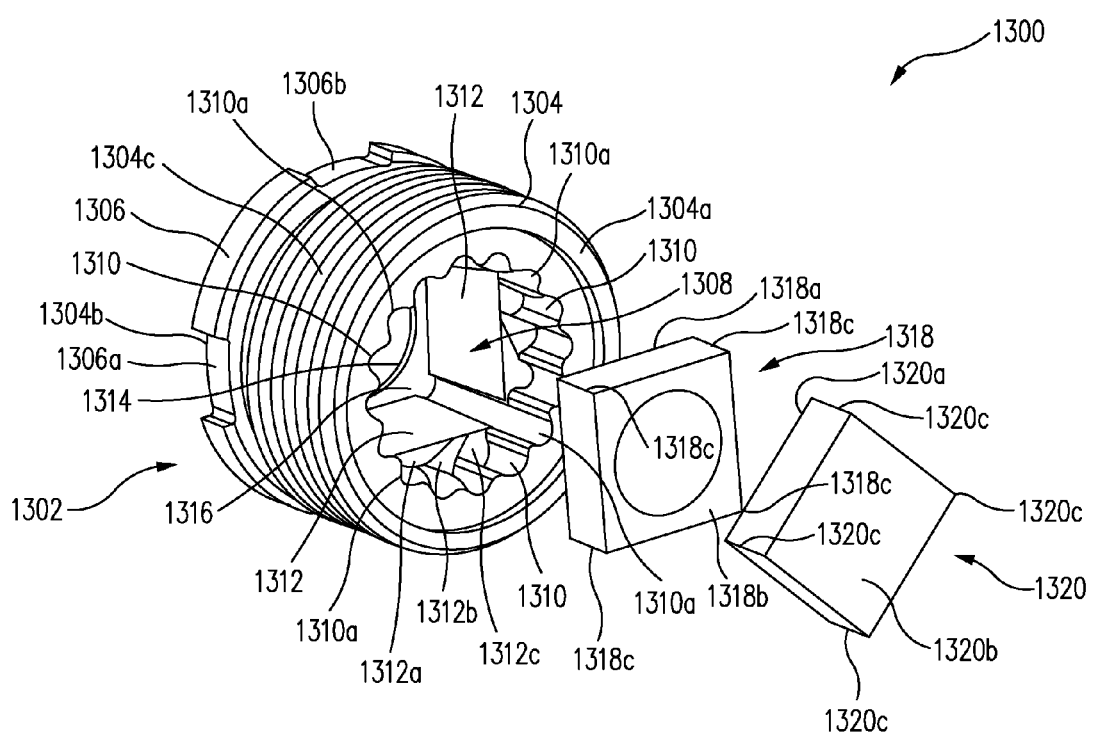
FIG. 13 illustrates an exploded, perspective view of an optical element spacing system in accordance with embodiments of the disclosure.

Referring. now to FIG. 13, an optical element spacing system 1300 is illustrated that may be used in some or all of the embodiments discussed above. As described in further detail below, the optical element spacing system 1300 may be used to position one or more lenses within a lens sleeve relative to each other and/or to an imaging module (e.g., an infrared imaging array) in order to, for example, accommodate manufacturing variability of the lenses, lens mounting features, lens sleeve mounting features, and/or other components in a imaging device such as a thermal and/or visible imaging device. While the embodiment illustrated and described below is directed to the relative positioning of two lenses, one of skill in the art will recognize that the teaching of the present disclosure may be applied to the positioning of a single lens in a lens sleeve (e.g., relative to an imager array), the positioning of more than 2 lenses in a lens sleeve, and/or a variety of other optical element/imaging device configurations known in the art.

The optical element spacing system 1300 includes a lens sleeve 1302 that may be, for example, the lens barrel 110 described above with reference to FIG. 3. The lens sleeve 1302 includes a substantially cylindrical base 1304 having a first end 1304*a*, a second end 1304*b* located opposite the base 1304 from the first end 1304*a*, and an outer surface 1304*c* extending between the first end 1304*a* and the second end 1304*b*. While the lens sleeve 1302 is illustrated and described as having a substantially cylindrical shape, the lens sleeve 1302 may include a variety of shapes while remaining within the scope of the present disclosure. A lip 1306 extends from the outer surface 1304*c* of the base 1304 adjacent the second end 1304*b* and defines a plurality of indentations 1306*a* and 1306*b* about its circumference. While two indentations 1306*a* and 1306*b* are illustrated in FIG. 13, other indentations may be provided such as, for example, those visible on the lens barrel 110 in FIG. 3. In an embodiment, a plurality of threads are provided on the outer surface 1304*c* of the base 1304 between the lip 1306 and the first end 1304*a* and may be used, for example, to couple the lens sleeve 1302 to a housing such as the housing 120 described above with reference to FIG. 3.

A lens cavity 1308 is defined by the base 1304 and extends into the base 1304 from the first end 1304*a*. In the illustrated embodiment, the lens cavity 1308 is at least partially defined by a plurality of channels 1310 (e.g., the semi-circular channels in the illustrated embodiment, and/or a variety of differently shaped channels, such as square, triangular, or other shapes as would be understood by one skilled in the art) that are located in a side-by-side orientation about the circumference of the lens cavity 1308. The plurality of channels 1310 include a plurality of first lens guide channels 1310*a* that, in the illustrated embodiment, may be a subset of the channels 1310.

A plurality of stepped lens positioning members 1312 extend from the lens sleeve 1302 adjacent the channels 1310 and the lens cavity 1308 at different positions about the circumference of the lens cavity 1308. In an embodiment, the stepped lens positioning members 1312 are integral to the lens sleeve 1302 and define at least part of the lens cavity 1308. In another embodiment, the stepped lens positioning members 1312 are separate from the lens sleeve 1302 and may be positioned in the lens cavity 1308 and secured to the lens sleeve 1302. Each stepped lens positioning member 1312 includes a plurality of lens positioning features such as the first lens positioning feature 1312*a*, the second lens positioning feature 1312*b*, and the third lens positioning feature 1312*c* called out on one of the stepped lens positioning members 1312 in FIG. 13. One of skill in the art will recognize that each of the stepped lens positioning members 1312 in the lens sleeve 1302 may include corresponding lens positioning features that are substantially similar to those illustrated and/or described in reference to FIG. 13.

In an embodiment, each of the lens positioning features on a particular stepped lens position member 1312 includes a substantially flat surface that is offset, or "stepped", relative to a flat surface provided on its adjacent lens positioning feature or features. For example, the first lens positioning features 1312*a* on each stepped lens positioning member 1312 include flat surfaces that all lie approximately in the same plane, the second lens positioning features 1312*b* on each stepped lens positioning member 1312 include flat surfaces that all lie approximately in the same plane but that are offset/stepped approximately 10 μm from the flat surfaces of the first lens positioning features 1312*a*, and the third lens positioning features 1312*b* on each stepped lens positioning member 1312 include flat surfaces that all lie approximately in the same plane but that are offset/stepped approximately 10 μm from the flat surfaces of the second lens positioning features 1312*b*.

Thus, the plurality of stepped lens positioning members 1312 provide a plurality of lens positioning features that include a first set of lens positioning features that provide a first lens support surface (e.g., the flat surfaces on the first lens positioning features 1312*a*) at a first position relative to the lens sleeve 1302, a second set of lens positioning features that provide a second lens support surface (e.g., the flat surfaces on the second lens positioning features 1312*b*) at a second position relative to the lens sleeve 1302 that is different from the first position, and a third set of lens positioning features that provide a third lens support surface (e.g., the flat surfaces on the third lens positioning features 1312*c*) at a third position relative to the lens sleeve 1302 that is different from both the first position and the second position.

As is described and illustrated, the stepped lens positioning members 1312 provide a "repeating staircase" structure about the circumference of the lens cavity that provides different supports surfaces for a lens. The repeating staircase structure includes multiple staircase units (the stepped lens positioning members 1312 in the illustrated embodiment) that are repeated about the circumference of the lens cavity and that may be provided with any number of "steps" to provide different support surfaces for a lens that allow that lens to be positioned at different positions relative to the lens sleeve 1302.

While only two stepped lens positioning members 1312 are visible in FIG. 13, the illustrated embodiment includes four stepped lens positioning members 1312 that extend from the channels 1310 such that a first lens guide channel 1310 is positioned between each pair of the stepped lens positioning members 1312. As discussed above, the stepped lens positioning members 1312 may be integral to the base 1304 (e.g., the lens sleeve 1302 may be molded, machined, and/or otherwise manufactured as a single piece that includes each of the stepped lens positioning members 1312.) As also discussed above, the stepped lens positioning members 1312 may be separate from the base 1304 (e.g., each of the stepped lens positioning members 1312 may be coupled to and decoupled from the base 1304 such that sets of stepped lens positioning members having lens positioning features that provide different lens support surfaces may be used with a common lens sleeve). While, in the illustrated embodiment, a particular number of stepped lens positioning members 1312 have been described that include a particular number of lens positioning features that are offset/stepped a particular distance relative to each other, one of skill in the art will recognize that a different number of stepped lens positioning members 1312, lens positioning features, and/or offset/stepping distances will fall within the scope of the present disclosure.

An aperture 1314 extends through the second surface 1304b to the lens cavity 1308 and a first lens seat 1316 is provided adjacent the aperture 1314, the lens cavity 1308, and an end of each first lens guide channels 1310a.

The optical element spacing system 1300 also includes a first lens 1318 having a first side 1318a, a second side 1318b located opposite the first lens 1318 from the first side 1318a, and a plurality of corner edges 1318c extending between the first side 1318a and the second side 1318b. In an embodiment, the first lens 1318 may be part of the optical element 180 described above with reference to FIG. 3. While the first lens 1318 is illustrated and described as an optical lens, one of skill in the art will recognize that the first lens 1318 may be replaced by a filter and/or a variety of other optical elements known in the art while remaining within the scope of the present disclosure.

The optical element spacing system 1300 also includes a second lens 1320 having a first side 1320a, a second side 1320b located opposite the second lens 1320 from the first side 1320a, and a plurality of corner edges 1320c extending between the first side 1320a and the second side 1320b. In an embodiment, the second lens 1320 may be part of the lens element 180 described above with reference to FIG. 3. While the second lens 1320 is illustrated and described as an optical lens, one of skill in the art will recognize that the second lens 1320 may be replaced by a filter and/or a variety of other optical elements known in the art while remaining within the scope of the present disclosure.

Figure 14:
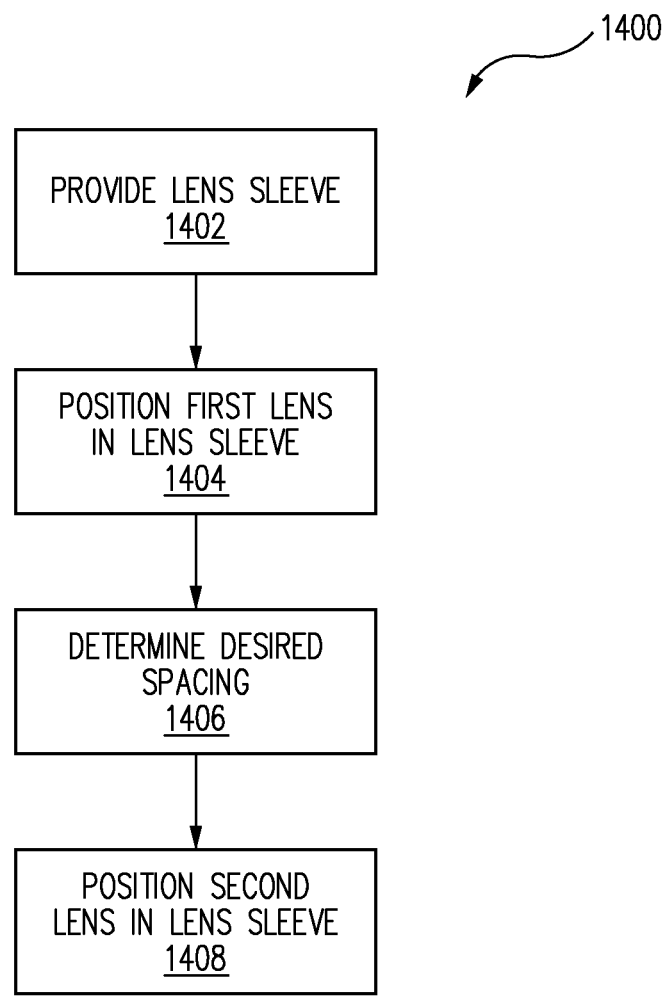
FIG. 14 illustrates a flow chart of a method for spacing optical elements in accordance with embodiments of the disclosure.

Referring now to FIGS. 13 and 14, a method 1400 for spacing lenses and/or other types of optical elements is illustrated. The method 1400 begins at block 1402 where a lens sleeve is provided. In an embodiment, the lens sleeve 1302 of the optical element spacing system 1300 illustrated in FIG. 13 is provided.

The method 1400 then proceeds to block 1404 where a first lens is positioned in the lens sleeve. In an embodiment, the first lens 1318 of the optical element spacing system 1300 illustrated in FIG. 13 is provided. The first lens 1318 is positioned adjacent the first surface 1304a of the lens sleeve 1302 such that the first side 1318a of the first lens 1318 is located adjacent the lens cavity 1308 with each of the corner edges 1318c on the first lens 1318 aligned with a respective one of the first lens guide channels 1310a defined by the lens sleeve 1302, as illustrated in FIG. 13. The first lens 1318 is then moved into the lens cavity 1308 such that the corner edges 1318c on the first lens 1318 become positioned in respective first lens guide channels 1310a that may operate to guide the first lens 1318 through the lens cavity 1308. The first lens 1318 may then be moved through the lens cavity 1308 until the portions of the first surface 1318a on the first lens 1318 that are adjacent the corner edges 1318c engage respective portions of the first lens seat 1316.

In an embodiment, the first lens 1318 may then be secured to the lens sleeve 1302 in the lens cavity 1308. For example, the first lens 1318 may be secured to the lens sleeve 1302 through an interference fit between the first lens 1318 and the lens sleeve 1302 (e.g., the bottom portions of each of the stepped second lens positioning members 1312 that are adjacent the first lens seat 1316.) In another example, the first lens 1318 may be secured to the first lens seat 1316 using an adhesive. In another example, the lens sleeve 1302 may include a variety of different features known in the art to mechanically or otherwise secure the first lens 1318 to the lens sleeve 1302 in the lens cavity 1308.

The method 1400 then proceeds to block 1406 where a desired spacing is determined. As discussed above, the first lens 1318 and the second lens 1320 must be precisely positioned relative to each other in order allow for high resolution imaging. However, manufacturing variability of the lenses, lens mounting features, and other components in the imaging device can present problems with this precise positioning. For example, in the manufacture of wafer level optics, complementary metal-oxide semiconductor (CMOS) imaging modules, infrared imaging modules, and/or a variety of other imaging devices known in the art, variation across wafers (e.g., from lot to lot) that are used to provide components of the imaging device may vary the optimal distance between lenses used in the imaging device. At block 1406 of the method 1400, a variety of different methods known in the art may be used to determine a desired spacing between the first lens 1318 and the second lens 1320 based on the manufacturing variability discussed above in order to provide optimal spacing between the first lens 1318 and the second lens 1320. For example, measurements may be taken of the first lens 1318, the second lens 1320, the lens mounting features in the lens sleeve 1302, the lens sleeve mounting features on the housing (e.g., the housing 120 described above with reference to FIG. 3), the infrared sensor assembly 128, and/or a variety of other imaging device components known in the art. Those measurements may then be used to determine a desired spacing between the first lens 1318 and the second lens 1320 that will optimize the performance of the lenses in the imaging device. In an embodiment, the desired spacing may be determined at different points in the method 1400 than that illustrated in FIG. 14 such as, for example, before performing the method 1400 or prior to block 1402 of the method 1400.

The method 1400 then proceeds to block 1408 where a second lens is positioned in the lens sleeve. In an embodiment, the second lens 1320 of the optical element spacing system 1300 illustrated in FIG. 13 is provided. In an embodiment, using the desired spacing determined in block 1406 of the method 1400, a user may select the first, second, or third set of lens positioning features on the stepped lens positioning members 1312 for positioning the second lens 1320 in the lens cavity 1308 of the lens sleeve 1302.

For example, in the embodiment illustrated in FIG. 13, the user has selected the second Set of lens positioning features (e.g., the second lens positioning features 1312b on the stepped lens positioning members 1312) for positioning the second lens 1320 in the lens cavity 1308 of the lens sleeve 1302. In response, the second lens 1320 is positioned adjacent the first surface 1304a of the lens sleeve 1302 such that the first side 1320a of the second lens 1320 is located adjacent the lens cavity 1308 with each of the corner edges 1320c on the second lens 1320 aligned with a respective one of the second lens positioning features 1312b located on the stepped lens positioning members 1312, as illustrated in FIG. 13. The second lens 1320 is then moved into the lens cavity 1308 such that the corner edges 1320c on the second lens 1320 become positioned in respective guide channels 1310 located immediately adjacent respective second lens positioning features 1312b. In an embodiment, the guide channels 1310 may operate to guide the second lens 1320 through the lens cavity 1308. The second lens 1320 may then be moved through the lens cavity 1308 until the portions of the first surface 1320a on the second lens 1320 that are adjacent the corner edges 1320c engage respective second lens positioning features 1312b.

In an embodiment, the second lens 1320 may be secured to the lens sleeve 1302 in the lens cavity 1308. For example, he second lens 1320 may be secured to the lens sleeve 1302 through an interference fit between the second lens 1320 and the lens sleeve 1302 (e.g., the respective channels 1310 that are immediately adjacent the respective second lens positioning features 1312b.) In another example, the second lens 1320 may be secured to the second lens positioning features 1312b using an adhesive. In another example, the lens sleeve 1302 may include a variety of different features known in the art to mechanically or otherwise secure the second lens 1320 to the lens sleeve 1302 in the lens cavity 1308.

Figure 15A:
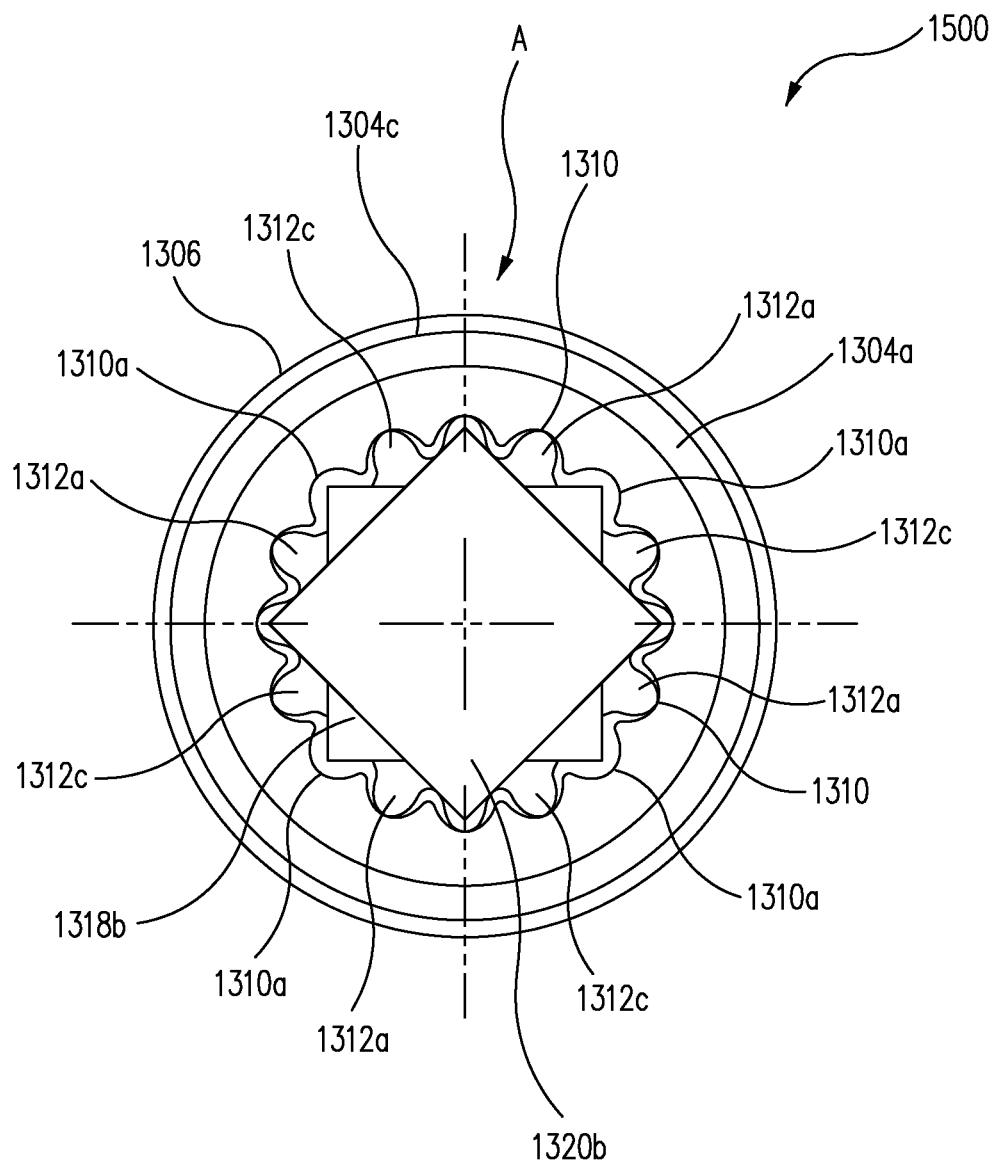
FIG. 15a illustrates a rear view of an assembled version of the optical element spacing system of FIG. 13 in accordance with an embodiment of the disclosure.
Figure 15B:
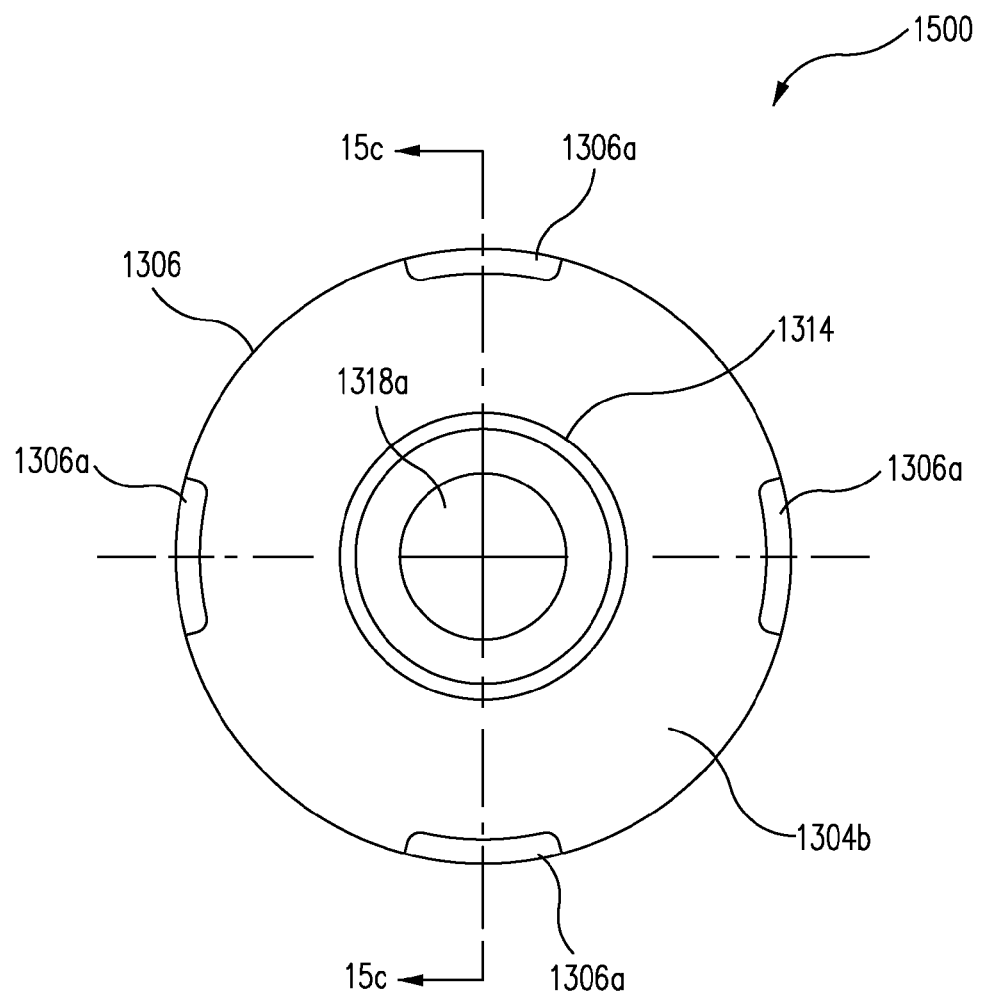
FIG. 15b illustrates a front view of an assembled version of the optical element spacing system of FIG. 13 in accordance with an embodiment of the disclosure.
Figure 15C:
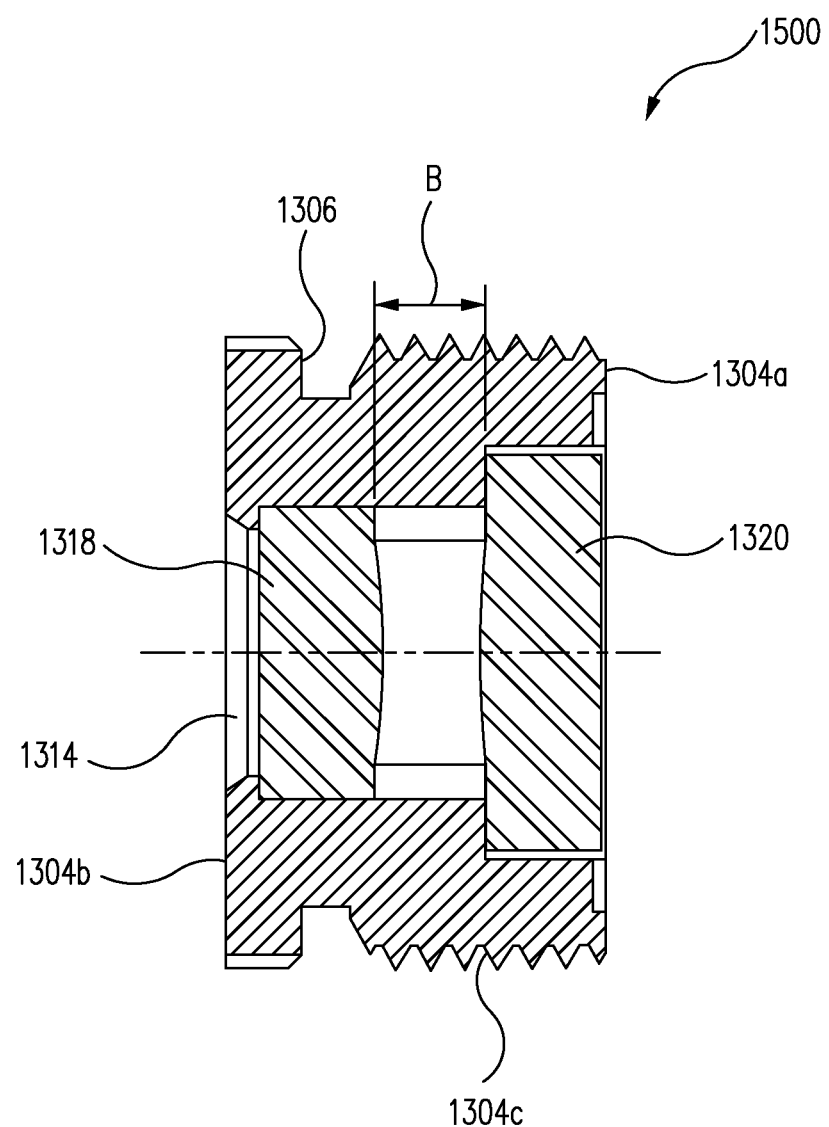
FIG. 15c illustrates a cross-sectional view of the assembled version of the optical element spacing system of FIG. 15b taken along line 15c-15c in accordance with an embodiment of the disclosure.

Referring now to FIGS. 15a, 15b, and 15c, an embodiment of an assembled optical element system 1500 is illustrated. In the illustrated embodiment, the assembled lens spacing system 1500 is provided by performing the method 1400 with the optical element system 1300 as described above. As can be seen in FIG. 15a, the second lens 1320 is positioned in the lens sleeve 1302 in a first radial orientation A relative to the first lens 1318. In the illustrated embodiment, the first radial orientation A of the second lens 1320 is offset 45 degrees from the first lens 1318 (e.g., each of the corner edges 1320c of the second lens 1320 are offset 45 degrees from respective corner edges 1318c of the first lens 1318.) FIG. 15c illustrates a cross section of the assembled optical element spacing system 1500 taken along line 15c-15c in. FIG. 15b. As can be seen in FIG. 15c, by positioning the first lens 1318 in the lens sleeve 1302 as described above according to the method 1400 (e.g., engaging the first lens 1318 with the first lens seat 1316) and positioning the second lens 1320 in the lens sleeve 1302 as described above according to the method 1400 (e.g., engaging the second lens 1320 with the second lens positioning features 1312b), the second lens 1320 is oriented and/or positioned a first distance B from the first lens 1318. In an embodiment, the first distance B is 1 millimeter.

Figure 16A:
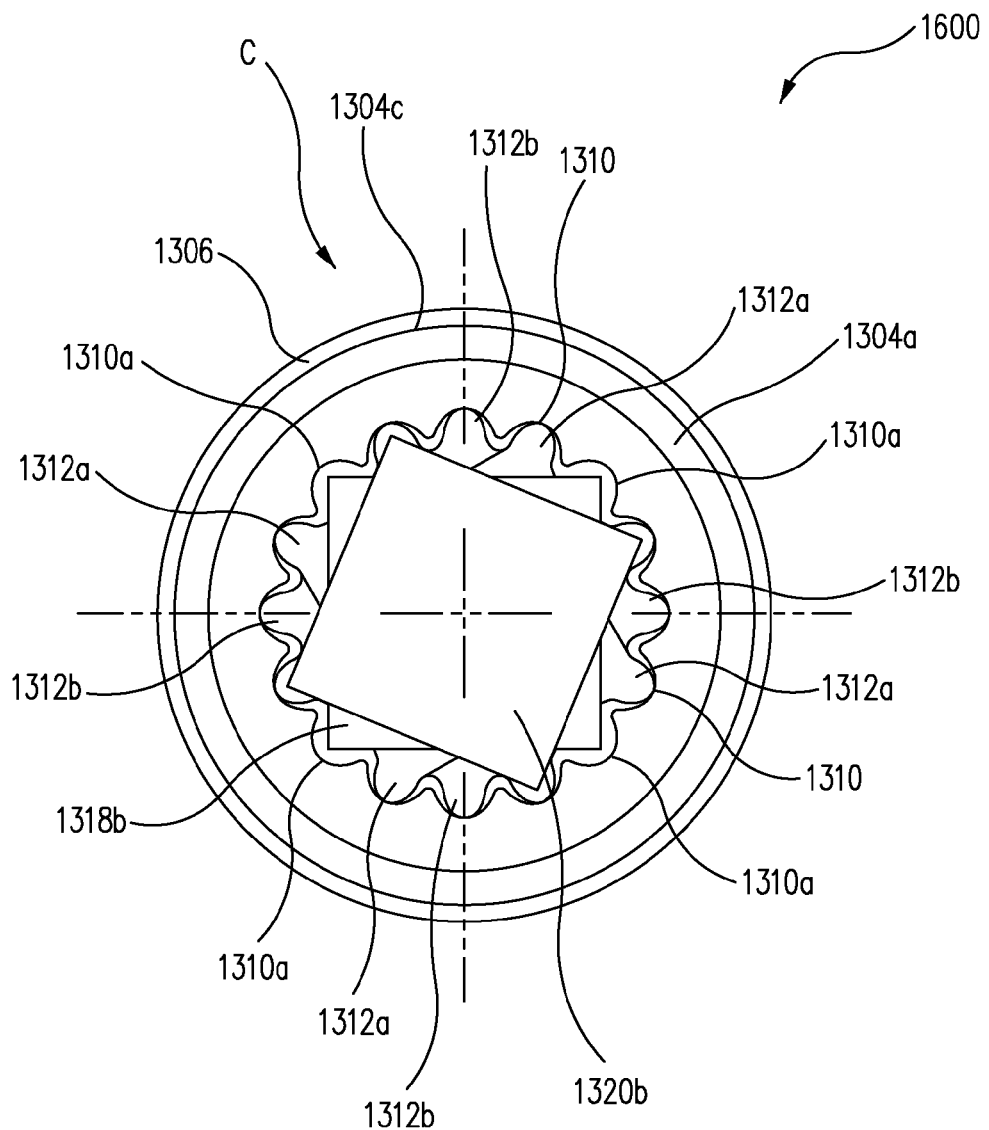
FIG. 16a illustrates a rear view of an assembled version of the optical element spacing system of FIG. 13 in accordance with embodiment of the disclosure.
Figure 16B:
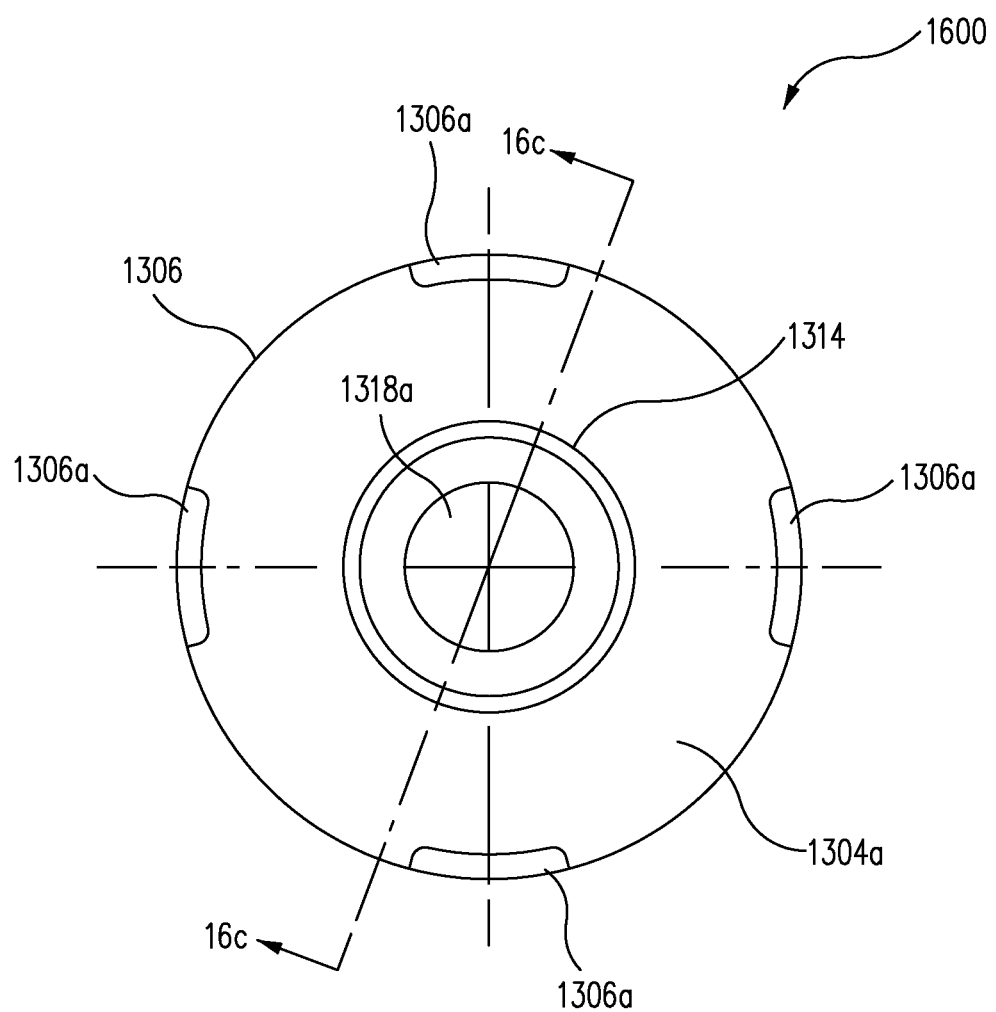
FIG. 16b illustrates a front view of an assembled version of the optical element spacing system of FIG. 13 in accordance with an embodiment of the disclosure.
Figure 16C:
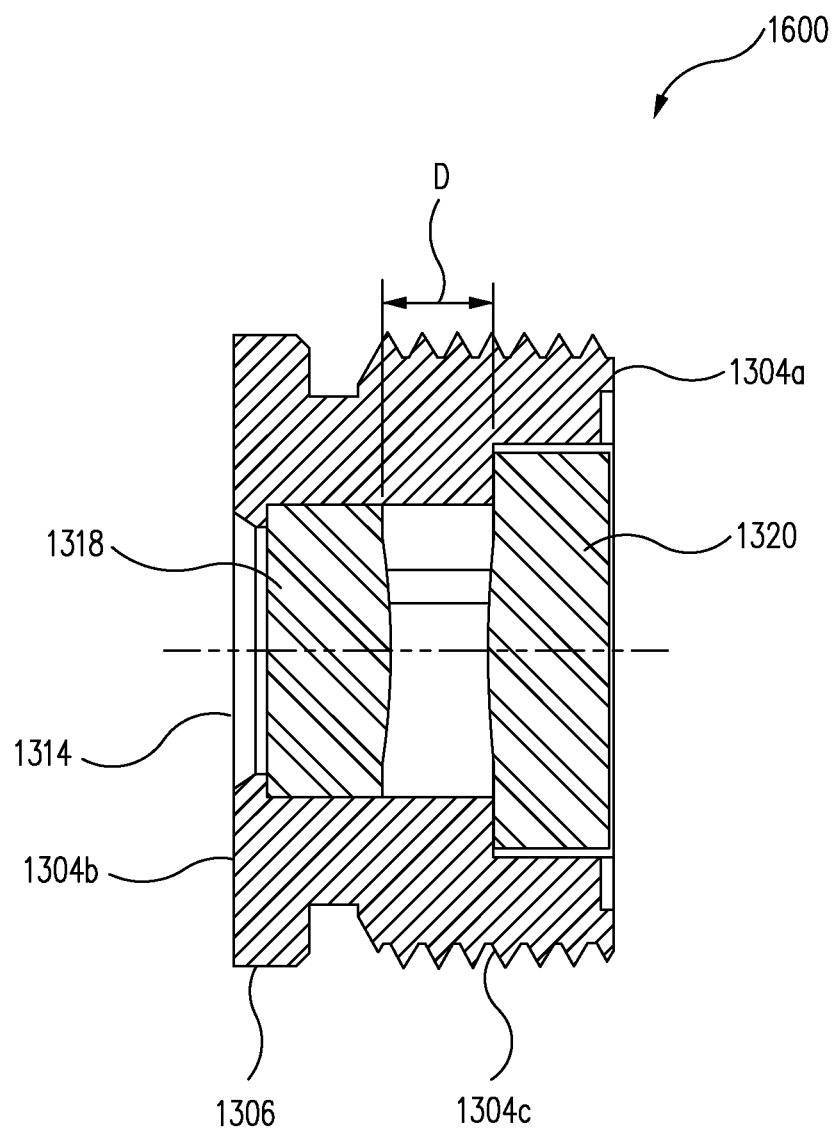
FIG. 16c illustrates a cross-sectional view of the assembled version of the optical element spacing system of FIG. 16b taken along line 16c-16c in accordance with an embodiment of the disclosure.

Referring now to FIGS. 16a, 16b, and 16c, an embodiment of an assembled optical element spacing system 1600 is illustrated. In the illustrated embodiment, the assembled optical element spacing system 1600 is provided by performing the method 1400 with the optical element spacing system 1300 substantially as described above. However, as can be seen in FIG. 16a, the second lens 1320 has been positioned in the lens sleeve 1302 in a second radial orientation C relative to the first lens 1318 by positioning the second lens 1320 on the third set of lens positioning features (e.g., the third lens positioning features 1312c on the stepped lens positioning members 1312.) In the illustrated embodiment, the second radial orientation C of the second lens 1320 is offset 22.5 degrees from the first lens 1318 (e.g., each of the corner edges 1320c of the second lens 1320 are offset 22.5 degrees, rotated clockwise, from respective corner edges 1318c of the first lens 1318.) FIG. 16c illustrates a cross section of the assembled optical element spacing system 1600 taken along line 16c-16c in FIG. 16b. As can be seen in FIG. 16c, by positioning the first lens 1318 in the lens sleeve 1302 as described above according to the method 1400 (e.g., engaging the first lens 1318 with the first lens seat 1316) and positioning the second lens 1320 in the lens sleeve 1302 substantially as described above according to the method 1400 (e.g., engaging the second lens 1320 with the third lens positioning features 1312c), the second lens 1320 is oriented and/or positioned a second distance D from the first lens 1318. In an embodiment, the second distance D is 1.01 millimeters (e.g., a 10 µm increase from the first distance B).

One of skill in the art will recognize that the second lens 1320 may be further repositioned into a third radial orientation relative to the first lens 1318 by positioning the second lens 1320 on the first set of lens positioning features (e.g., the first lens positioning features 1312a on the stepped lens positioning members 1312). According to the embodiments discussed above, such a positioning will orient and/or position the second lens 1320 a distance from the first lens 1318 equal to 0.99 millimeters (a 10 µm decrease from the first distance B). Thus, the second lens 1320 may be "clocked" relative to the first lens 1318 using different sets of the lens positioning features in order to modify the distance between the first lens 1318 and the second lens 1320 to optimize that distance based on a desired spacing between the lenses that takes into account manufacturing variability present in the manufacture of wafer level optics, complementary metal-oxide semiconductor (CMOS) imaging modules, infrared detectors, and/or a variety of other imaging devices. While a plurality of clocking angles that are offset by 22.5 degrees and that provide 10 µm changes in the lens spacing have been described, one of skill in the art will recognize that a variety of different clocking angles and lens spacing distances will fall within the scope of the present disclosure.

Following the positioning of the first lens 1318 and the second lens 1320 relative to each other in the lens sleeve 1302, the lens sleeve 1302 may be coupled to a housing, such as the housing 120 described above with reference to FIG. 3, in a similar manner as is described for the lens barrel 110. For example, the threads on the outer surface 1304c of the lens sleeve 1302 may be engaged with threads adjacent the aperture 122 in the housing 120 to secure the lens sleeve 1302 to the housing 120. The coupling of the lens sleeve 1302 to the housing 120 provides the first lens 1318 spaced apart from the infrared sensor assembly 128. With the second lens 1320 spaced apart from the first lens 1318 as described above, the operation of the infrared sensor assembly 128, the first lens 1318, and the second lens 1320 is optimized based on variability resulting from the manufacturing process of those and other components of the system.

Thus, a system and method have been described that provide for optimized lens spacing in an imaging device by allowing a second lens to be clocked relative to a first lens to change the distance between the two lenses. Such systems and methods eliminate the need for multiple different lens sleeves to provide different spacing between the lenses. One of skill in the art will recognize that the systems and methods described above may allow for lens spacing optimization on a per-lens basis. For example, during assembly of an imaging device, a second lens may be positioned in the lens sleeve at a first orientation relative to a first lens that may be later determined to provide a non-optimal spacing distance between the lenses. The second lens may then be removed from the lens sleeve, reoriented, and repositioned in the lens sleeve at a second orientation relative to the first lens that may provide an optimal spacing distance between the lenses. Lens positioning features may be provided on the lens sleeve to provide different spacing distances for the lenses that cover the range of expected variations in spacing distances that will be required to provide an optimal spacing distance that compensates for manufacturing variability known to effect the optimal lens spacing distance in a particular system.

Furthermore, one of skill in the art will recognize how the above teachings may be provided to space a single lens or other optical element relative to the lens sleeve (and, for example, an imager array), to provide the spacing between more than two lenses or other optical elements, and/or to provide spacing for a variety of other imaging device configurations known in the art.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the present disclosure. It should also be understood that numerous modifications and variations are possible in accordance with the principles of the present disclosure. Accordingly, the scope of the present disclosure is defined only by the following claims.

What is claimed is:

1. A lens spacing system, comprising:
   a lens sleeve with a first end and a second end and an interior surface defining a lens cavity;
   a first lens seat that is located on the lens sleeve and adjacent the lens cavity and that is operable to engage a first lens when the first lens is positioned in the lens cavity;
   a plurality of first lens guide channels that are defined by the lens sleeve and positioned in a spaced apart orientation adjacent the lens cavity and between the first end of the lens sleeve and the first lens seat; and
   a plurality of lens positioning features, located on the lens sleeve and adjacent the lens cavity, that have corresponding surfaces substantially perpendicular to an optical axis of the lens sleeve, wherein the optical axis is oriented from the first end of the lens sleeve to the second end of the lens sleeve;
   wherein a first set of the plurality of lens positioning features are operable to engage a plurality of corner edges of a second lens to orient the second lens a first distance from the first lens, and wherein a second set of the plurality of lens positioning features are operable to engage the plurality of corner edges of the second lens to orient the second lens a second distance from the first lens that is different than the first distance.

2. The system of claim 1, further comprising:
   a first lens and a second lens, wherein the first and second lenses are square; and
   wherein the plurality of first lens guide channels extend along a length of the lens sleeve to the first lens seat that is configured to support the first lens in the lens cavity, and wherein the plurality of first lens guide channels are configured such that the plurality of corner edges of the first lens are movable through the plurality of first lens guide channels to the first lens seat so that, situated on the first lens seat, the first lens is perpendicular to the optical axis.

3. The system of claim 1, wherein one of each of the first set and the second set of the plurality of lens positioning features are located between each pair of the plurality of first lens guide channels.

4. The system of claim 1, wherein the lens sleeve includes a plurality of threads extending from an outer surface of the lens sleeve that is located on an opposite side of the lens sleeve from the lens cavity.

5. The system of claim 1, wherein a third set of the plurality of lens positioning features are operable to engage the second lens to orient the second lens a third distance from the first lens that is different than the first distance and the second distance.

6. The system of claim 5, further comprising:
   a plurality of stepped lens positioning members, wherein each of the plurality of stepped lens positioning members includes one of the first set of lens positioning features and a first respective lens guide channel, one of the second set of lens positioning features and a second respective lens guide channel, and one of the third set of lens positioning features and a third respective lens guide channel, and
   wherein the one of the first set of lens positioning features, the one of the second set of lens positioning features, and the one of the third set of lens positioning features are discrete from each other.

7. The system of claim 6, wherein the plurality of stepped lens positioning members are operable to allow the second lens to be positioned in the lens cavity in a first radial orientation relative to the first lens and allow only the corner edges of the second lens to be in engagement with the first set of lens positioning features, in a second radial orientation relative to the first lens and allow only the corner edges of the second lens to be in engagement with the second set of lens positioning features, and in a third radial orientation relative to the first lens and allow only the corner edges of the second lens to be in engagement with the third set of lens positioning features.

8. A thermal imaging device, comprising:
   a housing;
   at least one infrared sensor located in the housing;
   a lens sleeve coupled to the housing and defining an interior lens cavity;

a first lens secured in the lens cavity and spaced apart from the at least one infrared sensor at a first position relative to the lens sleeve;

a plurality of lens positioning features extending from the lens sleeve, located adjacent the lens cavity, and including a first set of the plurality of lens positioning features that provide a first lens support surface located at a second position relative to the lens sleeve that is different from the first position, and a second set of the plurality of lens positioning features that provide a second lens support surface located at a third position relative to the lens sleeve that is different from the first position and the second position;

a plurality of first lens guide channels that extend along a length of the lens sleeve to a first lens seat that is configured to support the first lens in the lens cavity, wherein the plurality of first lens guide channels are configured such that the first lens is movable through the plurality of first lens guide channels to the first lens seat; and a second lens engaging either the first set or the second set of the plurality of lens positioning features.

9. The device of claim 8, wherein the plurality of lens positioning features include a third set that provide a third lens support surface located at a fourth position relative to the lens sleeve that is different from the first position, the second position, and the third position, and wherein only corner edges of the second lens engage either the first set, the second set, or the third set of the plurality of lens positioning features.

10. The device of claim 9, further comprising:
a plurality of stepped lens positioning members, wherein each of the plurality of stepped lens positioning members includes one of the first set of lens positioning features, one of the second set of lens positioning features, and one of the third set of lens positioning features, and wherein each one of the first, second, and third set of lens positioning features is discrete from the other, and has respective lens guide channels.

11. The device of claim 10, wherein the plurality of stepped lens positioning members are operable to allow the second lens to be positioned in the lens cavity in a first radial orientation relative to the first lens and in engagement with the first set of lens positioning features, in a second radial orientation relative to the first lens and in engagement with the second set of lens positioning features, and in a third radial orientation relative to the first lens and in engagement with the third set of lens positioning features.

12. The device of claim 11, wherein each of the plurality of stepped lens positioning members are located between a pair of the plurality of first lens guide channels, and wherein the first and the second lenses are square and perpendicular to the optical axis when engaged with the first lens seat or the plurality of lens positioning features, respectively.

13. The device of claim 8, wherein the lens sleeve includes a plurality of threads that extend from an outer surface of the lens sleeve and that couple the lens sleeve to the housing.

14. A method for spacing lenses, the method comprising:
providing a lens sleeve with a first end, a second end, and an interior surface defining a lens cavity and including a plurality of lens positioning features that extend from the lens sleeve and include a first set and a second set of the plurality of lens positioning features;

positioning a first lens in the lens cavity; and positioning a second lens in the lens cavity by engaging a plurality of corner edges of the second lens with either the first set or the second set of the plurality of lens positioning features that have corresponding surfaces substantially perpendicular to an optical axis of the lens sleeve, and wherein the optical axis is oriented within the lens sleeve from the first end of the lens sleeve to the second end of the lens sleeve;

wherein the positioning of the first lens in the lens cavity includes moving the first lens through a plurality of first lens guide channels defined by the lens sleeve, and engaging the first lens with a first lens seat that is located adjacent the lens cavity;

wherein the engagement of the second lens with the first set of the plurality of lens positioning features positions the second lens a first distance from the first lens; and wherein the engagement of the second lens with the second set of the plurality of lens positioning features position the second lens a second distance from the first lens that is different from the first distance.

15. The method of claim 14, wherein the plurality of lens positioning features include a third set and the positioning the second lens in the lens cavity includes engaging the first set, the second set, or the third set of the lens positioning features, and wherein the engagement of the second lens with the third set of the plurality of lens positioning features positions the second lens a third distance from the first lens that is different from the first distance and the second distance.

16. The method of claim 15, wherein the second lens is positioned in a first radial orientation relative to the first lens if engaging the first set of lens positioning features, in a second radial orientation relative to the first lens if engaging the second set of lens positioning features, and in a third radial orientation relative to the first lens if engaging the third set of lens positioning features, and wherein the plurality of lens positioning features supports the second lens only at corners of the second lens.

17. The method of claim 14, further comprising:
coupling the lens sleeve to a housing that houses at least one infrared sensor.

18. The method of claim 14, further comprising:
determining a desired spacing between the first lens and the second lens, wherein, via a respective guide channel, the second lens is engaged with either the first set or the second set of the plurality of lens positioning features based on the desired spacing.

19. A lens spacing system, comprising:
a lens sleeve with a first end and a second end and an interior surface defining a lens cavity;

a first lens seat that is located on the lens sleeve and adjacent the lens cavity and that is operable to engage a first lens when the first lens is positioned in the lens cavity; and a plurality of lens positioning features, located on the lens sleeve and adjacent the lens cavity, that have corresponding surfaces substantially perpendicular to an optical axis of the lens sleeve, wherein the optical axis is oriented from the first end of the lens sleeve to the second end of the lens sleeve;

wherein a first set of the plurality of lens positioning features are operable to engage a plurality of corner edges of a second lens to orient the second lens a first distance from the first lens, and wherein a second set of the plurality of lens positioning features are operable to engage the plurality of corner edges of the second lens to orient the second lens a second distance from the first lens that is different than the first distance; and wherein the lens sleeve includes a plurality of threads extending from an outer surface of the lens sleeve that is located on an opposite side of the lens sleeve from the lens cavity.

20. A lens spacing system, comprising:
a lens sleeve with a first end and a second end and an interior surface defining a lens cavity;
a first lens seat that is located on the lens sleeve and adjacent the lens cavity and that is operable to engage a first lens when the first lens is positioned in the lens cavity; and
a plurality of lens positioning features, located on the lens sleeve and adjacent the lens cavity, that have corresponding surfaces substantially perpendicular to an optical axis of the lens sleeve, wherein the optical axis is oriented from the first end of the lens sleeve to the second end of the lens sleeve;
wherein a first set of the plurality of lens positioning features are operable to engage a plurality of corner edges of a second lens to orient the second lens a first distance from the first lens, and wherein a second set of the plurality of lens positioning features are operable to engage the plurality of corner edges of the second lens to orient the second lens a second distance from the first lens that is different than the first distance; and
wherein engaged surfaces of the plurality of corner edges of the second lens are substantially perpendicular to the interior surface and to the optical axis, and extend away from the second lens while within and parallel to a plane occupied by the second lens, the plane disposed perpendicular to the optical axis.

21. The system of claim 20, further comprising:
a plurality of first lens guide channels that are defined by the lens sleeve and positioned in a spaced apart orientation adjacent the lens cavity and between the first end of the lens sleeve and the first lens seat, and wherein the plurality of first lens guide channels are configured such that the plurality of corner edges of the first lens are movable through the plurality of first lens guide channels to engage the first lens with the first lens seat.

22. The system of claim 21, further comprising:
a first lens and a second lens, wherein the first and second lenses are square, and wherein the first and second lenses are perpendicular to the optical axis when in engagement with the first lens seat and the plurality of lens positioning features, respectively.

* * * * *